United States Patent
Lee et al.

(10) Patent No.: US 10,986,564 B2
(45) Date of Patent: **\*Apr. 20, 2021**

(54) METHOD AND APPARATUS FOR SYSTEM INFORMATION BLOCK (SIB) ACQUISITION FOR WIRELESS TRANSMIT/RECEIVE UNITS (WTRUS) IN NON-CE AND COVERAGE ENHANCED (CE) MODES

(71) Applicant: INTERDIGITAL PATENT HOLDINGS, INC., Wilmington, DE (US)

(72) Inventors: Moon-il Lee, Melville, NY (US); Janet A. Stern-Berkowitz, Little Neck, NY (US); Samian Kaur, Plymouth Meeting, PA (US); Diana Pani, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,631

(22) Filed: Dec. 23, 2019

(65) Prior Publication Data

US 2020/0137669 A1 Apr. 30, 2020

Related U.S. Application Data

(63) Continuation of application No. 15/126,802, filed as application No. PCT/US2015/021606 on Mar. 19, 2015, now Pat. No. 10,555,244.

(Continued)

(51) Int. Cl.
*H04W 48/12* (2009.01)
*H04W 68/00* (2009.01)

(Continued)

(52) U.S. Cl.
CPC ......... *H04W 48/12* (2013.01); *H04W 68/005* (2013.01); *H04W 72/042* (2013.01); *H04W 4/90* (2018.02)

(58) Field of Classification Search
CPC .................................................... H04W 48/12
See application file for complete search history.

(56) References Cited

U.S. PATENT DOCUMENTS

| 8,401,542 B2 | 3/2013 | Chung et al. | |
|---|---|---|---|
| 2011/0002250 A1* | 1/2011 | Wang | H04W 76/40 |
| | | | 370/311 |

(Continued)

FOREIGN PATENT DOCUMENTS

EP 2 257 092 12/2010

OTHER PUBLICATIONS

Catt, "Paging coverage improvement details for MTC UEs," 3GPP TSG RAN WG1 Meeting #76, R1-140079, Prague, Czech Republic (Feb. 10-14, 2014).

(Continued)

*Primary Examiner* — John D Blanton
(74) *Attorney, Agent, or Firm* — Volpe Koenig

(57) ABSTRACT

A method and apparatus are described. A method includes determining whether the apparatus is in a coverage enhancement (CE) mode or a non-CE mode. The method further includes receiving a CE-system information block (CE-SIB) on a physical downlink shared channel (PDSCH) based on at least one of a known location or at least one known parameter for the CE-SIB, on a condition that the WTRU is determined to be in the CE mode.

16 Claims, 7 Drawing Sheets

Related U.S. Application Data

(60) Provisional application No. 61/955,645, filed on Mar. 19, 2014.

(51) Int. Cl.
*H04W 72/04* (2009.01)
*H04W 4/90* (2018.01)

(56) References Cited

U.S. PATENT DOCUMENTS

| | | | | |
|---|---|---|---|---|
| 2011/0086608 | A1* | 4/2011 | Yamagishi | H04W 48/12 455/404.1 |
| 2012/0122495 | A1* | 5/2012 | Weng | H04W 68/025 455/458 |
| 2012/0282965 | A1* | 11/2012 | Kim | H04W 48/16 455/515 |
| 2013/0039284 | A1* | 2/2013 | Marinier | H04L 5/001 370/329 |
| 2013/0194998 | A1 | 8/2013 | Susitaival et al. | |
| 2013/0223366 | A1* | 8/2013 | Papasakellariou | H04L 5/0094 370/329 |
| 2013/0315157 | A1* | 11/2013 | Krishnamurthy | H04L 5/0053 370/329 |
| 2014/0362752 | A1* | 12/2014 | Jha | H04N 21/26208 370/311 |
| 2015/0085717 | A1 | 3/2015 | Papasakellariou et al. | |
| 2018/0007733 | A1* | 1/2018 | Mochizuki | H04W 48/16 |

OTHER PUBLICATIONS

Ericsson, "System information for enhanced coverage MTC UE," 3GPP TSG RAN WG1 Meeting #74bis, R1-134647, Guangzhou, China, (Oct. 7-11, 2013).
Fujitsu, "Correction for system information acquisition," 3GPP TSG-RAN WG2 Meeting #80, R2-125470, New Orleans, US (Nov. 12-26, 2012).
LG Electronics, Inc., "Impacts of extended coverage on system information," 3GPP TSG-RAN2 Meeting #85, R2-140780, Prague, Czech Republic (Feb. 10-14, 2014).
Mediatek Inc., "On the need of PDCCH for SIB and other Common Channels," 3GPP TSG-RAN WG1 #75, R1-135422, San Francisco, USA (Nov. 11-15, 2013).
Mediatek Inc., "On the need of PDCCH for SIB, RAR and Paging," 3GPP TSG-RAN WG1 #76, R1-140239, Prague, Czech Republic (Feb. 10-14, 2014).
Nsn et al., "Reduced downlink bandwidth analysis for low cost MTC UEs," 3GPP TSG-RAN WG2 Meeting #85, R2-140046, Prague, Czech Republic (Feb. 10-14, 2014).
Nsn et al.,"SIB Coverage Enhancement," 3GPP TSG RAN1#75, R1-135572, San Francisco, USA (Nov. 11-15, 2013).
Renesas Mobile Europe Ltd, "Signaling mechanisms for TDD eIMTA," 3GPP TSG RAN WG1 Meeting #72bis, R1-131369, Chicago, USA (Apr. 15-19, 2013).
Samsung, "System Information for coverage extended UE," 3GPP TSG-RAN WG2#85, R2-140718, Prague, Czech Republic (Feb. 10-14, 2014).
Third Generation Partnership Project, "Technical Specification Group Radio Access Network; Evolved Universal Terrestrial Radio Access (E-UTRA); Physical channels and modulation (Release 12)," 3GPP TS 36.211 V12.4.0 (Dec. 2014).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical channels and modulation (Release 11)," 3GPP TS 36.211 V11.6.0 (Sep. 2014).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.5.0 (Dec. 2013).
Third Generation Partnership Project, "Technical Specification Group Radio Access Network; Evolved Universal Terrestrial Radio Access (E-UTRA); Physical Channels and Modulation (Release 12)," 3GPP TS 36.211 V12.0.0 (Dec. 2013).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.3.0 (Dec. 2014).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.5.1 (Sep. 2014).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.4.0 (Dec. 2013).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.9.0 (Dec. 2014).
Third Generation Partnership Project, "Technical Specification Group Radio Access Network; Evolved Universal Terrestrial Radio Access (E-UTRA); Physical layer procedures (Release 12)," 3GPP TS 36.213 V12.4.0 (Dec. 2014).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 11)," 3GPP TS 36.213 V11.5.0 (Dec. 2013).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.11.0 (Dec. 2013).
Third Generation Partnership Project, "Technical Specification Group Radio Access Network; Evolved Universal Terrestrial Radio Access (E-UTRA); Physical layer procedures (Release 10)," 3GPP TS 36.213 V12.0.0 (Dec. 2013).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 10)," 3GPP TS 36.213 V10.12.0 (Mar. 2014).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.10.0 (Dec. 2014).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.4.1 (Dec. 2014).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.15.0 (Dec. 2014).

Third Generation Partnership Project, "Technical Specification Group Radio Access Network; volved Universal Terrestrial Radio Access (E-UTRA); Radio Resource Control (RRC); Protocol specification (Release 8)," 3GPP TS 36.331 V8.21.0 (Jun. 2014).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.1.0 (Mar. 2014).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.7.0 (Mar. 2014).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.12.0 (Dec. 2013).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.17.0 (Dec. 2013).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.18.0 (Jun. 2014).

Third Generation Partnership Project, "Technical Specification Group Radio Access Network;Evolved Universal Terrestrial Radio Access (E-UTRA) and Evolved Universal Terrestrial Radio Access Network (E-UTRAN); Overall description; Stage 2 (Release 12)," 3GPP TS 36.300 V12.0.0 (Dec. 2013).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.4.0 (Dec. 2014).

* cited by examiner

METHOD AND APPARATUS FOR SYSTEM INFORMATION BLOCK (SIB) ACQUISITION FOR WIRELESS TRANSMIT/RECEIVE UNITS (WTRUS) IN NON-CE AND COVERAGE ENHANCED (CE) MODES

CROSS REFERENCE TO RELATED APPLICATIONS

This application is a continuation of U.S. patent application Ser. No. 15/126,802, filed Sep. 16, 2016, which is the U.S. National Stage, under 35 U.S.C. § 371, of International Application No. PCT/US2015/021606 filed Mar. 19, 2015, which claims the benefit of U.S. Provisional Application No. 61/955,645 filed Mar. 19, 2014, the contents of which are hereby incorporated by reference herein.

BACKGROUND

In the 3rd Generation Partnership (3GPP) Long Term Evolution Advanced (LTE-A), coverage enhancement techniques have been studied to support wireless transmit/receive units (WTRUs) that may be located in a coverage limited area. Such a WTRU may be delay-tolerant, have reduced capabilities, or operate with limited service when located in a coverage limited area. An example of such a WTRU is a low-cost or low-complexity machine type communication (LC-MTC) WTRU, such as a smart meter or sensor, which may be located, for example, in the basement of a house where very high penetration loss is expected.

SUMMARY

A method and apparatus are described. A method includes determining whether the apparatus is in a coverage enhancement (CE) mode or a non-CE mode. The method further includes receiving a CE-system information block (CE-SIB) on a physical downlink shared channel (PDSCH) based on at least one of a known location or at least one known parameter for the CE-SIB, on a condition that the WTRU is determined to be in the CE mode.

BRIEF DESCRIPTION OF THE DRAWINGS

A more detailed understanding may be had from the following description, given by way of example in conjunction with the accompanying drawings wherein:

FIG. 10 is a system diagram of an example radio access network and an example core network that may be used within the communications system illustrated in FIG. 1A;

DETAILED DESCRIPTION

Figure 1A:
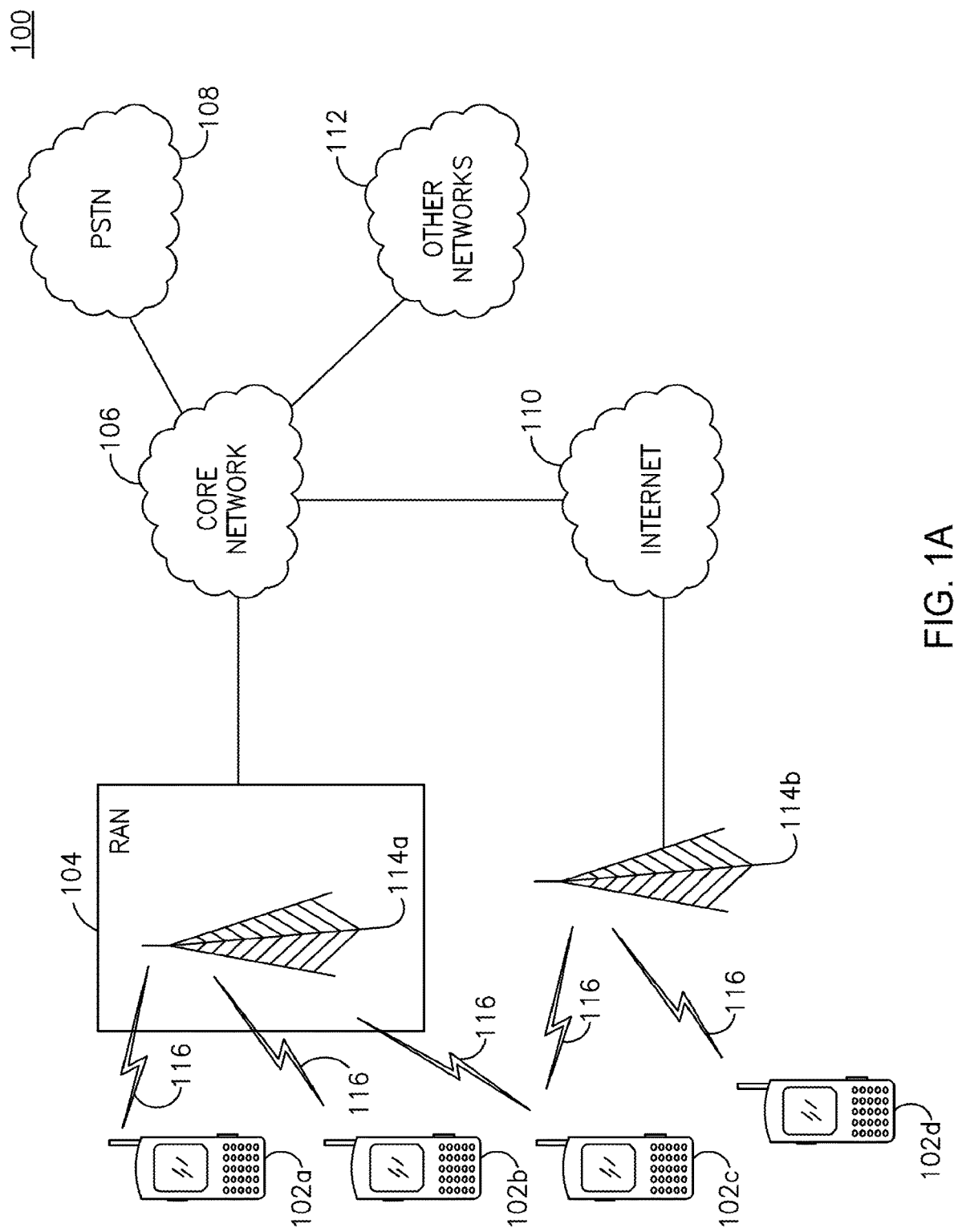
FIG. 1A is a system diagram of an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users or MTC devices. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, MTC devices and the like.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors, e.g., cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
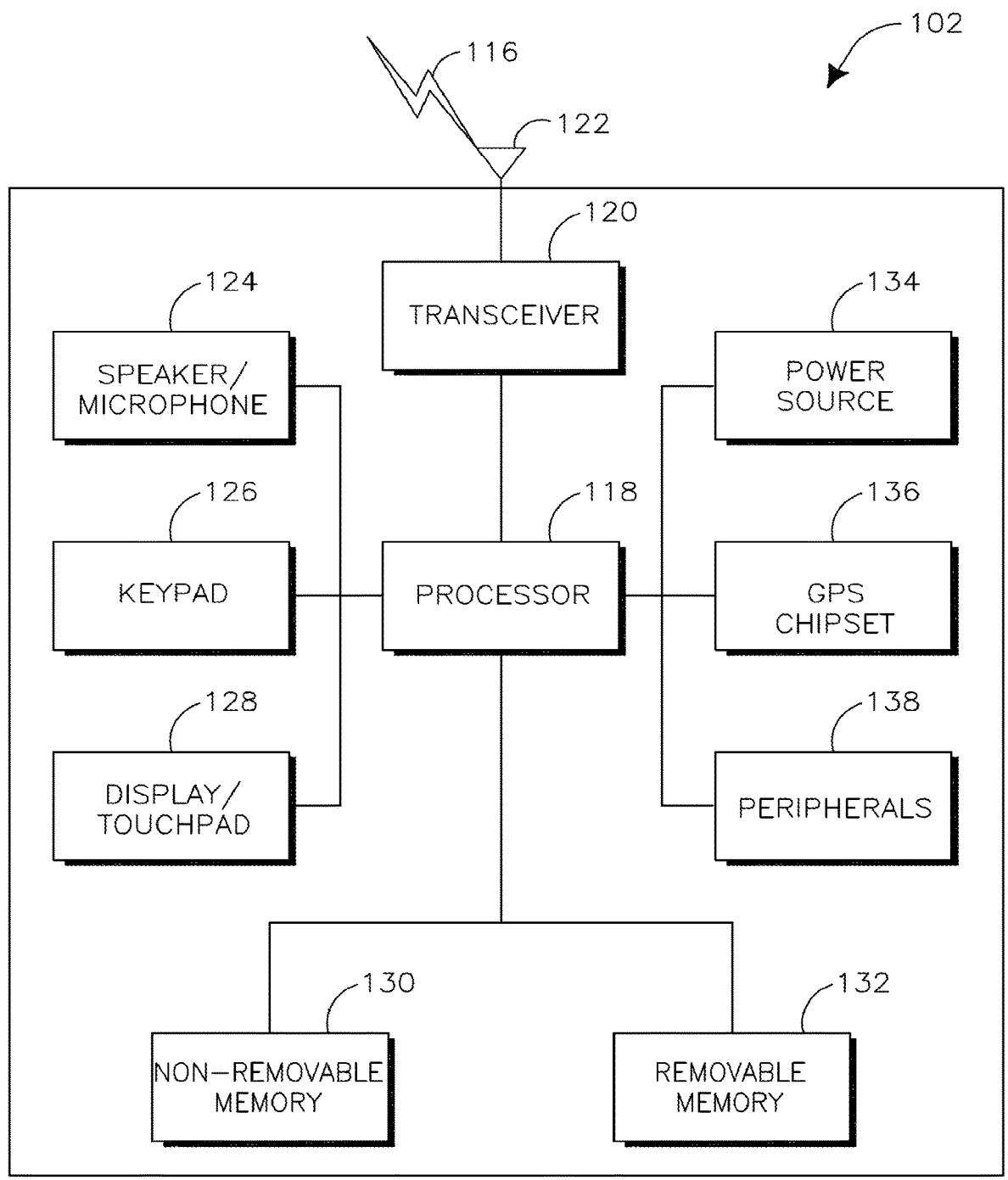
FIG. 1B is a system diagram of an example wireless transmit/receive unit (WTRU) that may be used within the communications system illustrated in FIG. 1A.
Figure 1C:
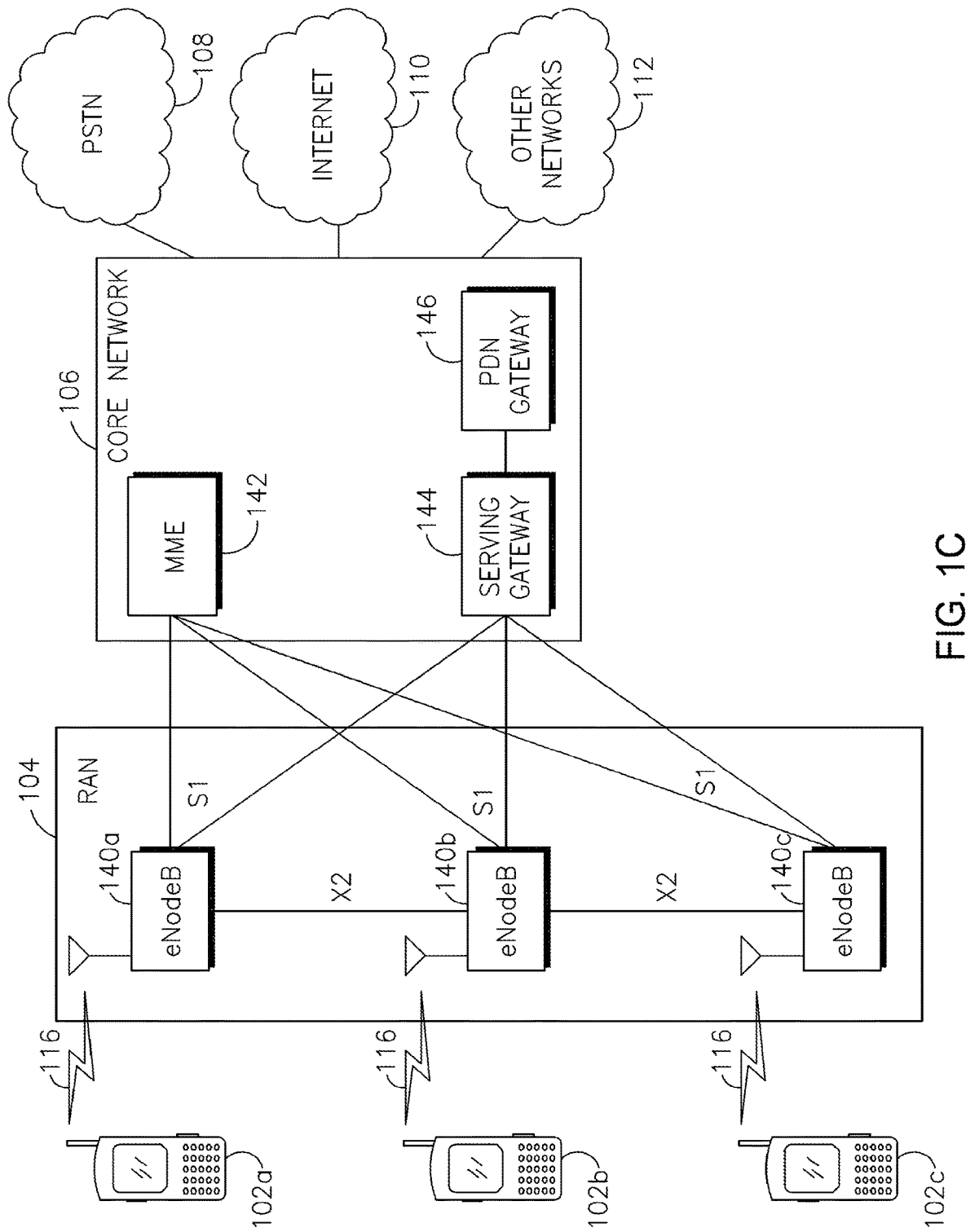

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 10 shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 10, the eNBs 140a, 140b, 140c may communicate with one another over an X2 interface.

The core network 106 shown in FIG. 10 may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In an LTE-A or other system, WTRUs which may be or include machine-type communication (MTC) or low-cost (LC)-MTC WTRUs, may operate in a coverage enhanced (CE) mode for uplink, downlink, or both uplink and downlink. In the CE mode, up to an amount (e.g., 20 dB) of coverage enhancement may be supported for uplink, downlink, or both uplink and downlink with one or more relaxed requirements, such as relaxed delay and/or throughput requirements.

A WTRU in CE or non-CE (e.g., legacy or normal) mode may or may need to acquire system information (SI). SI may be information that the WTRU may need for accessing the cell or for performing cell re-selection. SI may be information related to at least one of intra-frequency, inter-frequency or inter-radio access technology (inter-RAT) measurements, cell selections or reselections. Such system information may be carried by system information blocks (SIBs). Some of the information carried by the SIBs may be applicable to WTRUs in radio resource control (RRC) idle mode (e.g., RRC_IDLE mode). Other system information may or may also be applicable to WTRUs in RRC connected mode (e.g., RRC_CONNECTED mode).

Each SIB may include a set of functionality-related parameters. A SIB may be one of a number of different types, which may include, for example, a master information block (MIB), a system information block type 1 (SIB1), a system information block type 2 (SIB2) or system information block types 3-8 (SIB3-8). The MIB may include a number, for example a limited number, of parameters that may be considered essential for a WTRU's access or initial access to the network. The MIB may be broadcast every 40 ms, and repetitions may be made within 40 ms. SIB1 may include parameters that may be needed to determine if a cell is suitable for cell selection. SIB1 may include information regarding the time-domain scheduling of the other SIBs. SIB1 may be broadcast every 80 ms, and repetitions may be made within 80 ms. Transmissions may be according to the system frame number (SFN). For example, a first transmission of SIB1 may be in radio frames for which the SFN mod 8=0, and repetitions may be scheduled in other radio frames for which SFN mod 2=0. SIB1 may be transmitted in subframe #5 of a radio frame. SIB2 may include common and shared channel information, and SIB3-SIB8 may include parameters that may be used for or to control intra-frequency, inter-frequency and inter-RAT cell re-selection.

The SFN or at least part of the SFN (e.g., the most significant 8 bits of a 10-bit SFN) may be included in the MIB. The Physical Broadcast Channel (PBCH) may carry the MIB.

SIBs, e.g., SIB2-SIB16, may be mapped to System Information (SI) messages, which may be transmitted on the downlink shared channel (DL-SCH). The physical DL shared channel (PDSCH) may carry system information, e.g., SIBs such as one or more of SIBs 2-16. The mapping of SIBs to SI messages may be flexible. The mapping may be carried in SIB1 (e.g., SystemInformationBlock1) and may be included in schedulingInfoList. Each SIB may be contained in (e.g., only in) a single SI message. SIBs having the same scheduling requirement or periodicity may be mapped to the same SI message. SIB2 (e.g., SystemInformationBlockType2) may or may always be mapped to the SI message that corresponds to the first entry in the list of SI messages in schedulingInfoList.

Each SI message may be transmitted periodically in a time domain window (SI-window), and SI-windows for different SI messages may not overlap. Within an SI window, an SI message may not need to be consecutive and may be dynamically scheduled (e.g., using an SI-radio network temporary identifier (SI-RNTI)). The length of the SI-window may be common for all SI messages and may be configurable. A complete SI message may be channel coded and mapped to multiple, but not necessarily consecutive, subframes in an SI window. The subsequent SI transmissions may be seen as autonomous hybrid automatic repeat request (HARQ) retransmissions of the first SI transmission.

A procedure to determine the start of the SI-window for an SI message may be as follows. For a particular SI message, determine the number n, which may correspond to the order of entry in the list of SI messages. Determine x=(n−1)*w, where w may be the si-WindowLength. The SI-window may start at the subframe #a, where a=x mod 10, in the radio frame for which system frame number (SFN) mod T=FLOOR (x/10), where T may be the si-Periodicity of the concerned SI message.

A change in system information (e.g., other than certain system information such as for an Earthquake Tsunami Warning System (ETWS), Commercial Mobile Alert Service (CMAS), and/or Extended Access Barring (EAB) parameters) may or may only occur in specific frames. For example, a modification period may be used.

Figure 2:
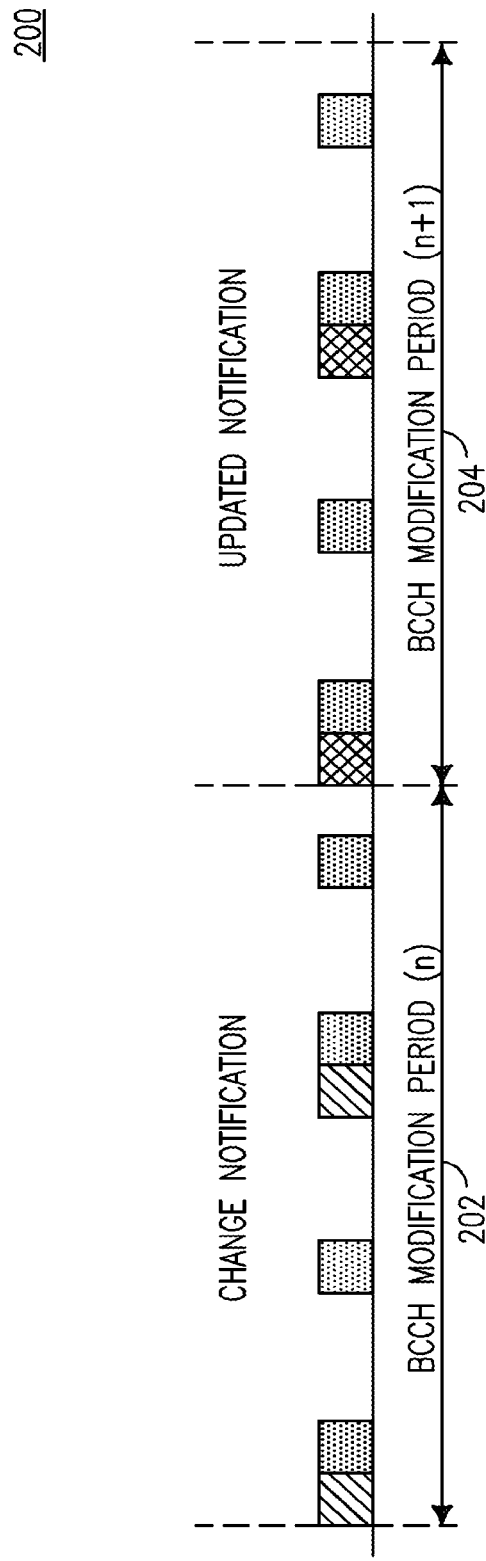
FIG. 2 is a diagram of an example of a modification period for a system information (SI) update.

FIG. 2 is a diagram 200 of an example modification period for an SI update. In the example illustrated in FIG. 2, when the network changes at least some of the system information, it may first notify the WTRUs about the change, for example, during or throughout a modification period 202. The network may then send the updated information in the next modification period 204. The original and updated system information are represented by different patterns in FIG. 2. Upon receiving a change notification, for example in the modification period 202, the WTRU acquires the new system information, for example from the start of the next modification period 204. The WTRU may apply the previously acquired system information until the WTRU acquires the new system information.

The modification period boundaries may be defined by SFN values for which SFN mod m=0, where m may be the number of radio frames comprising the modification period. The modification period may be configured by system information. A Paging message may be used to inform WTRUs about a system information change. If a WTRU receives a Paging Message that includes an indication of system information modification, e.g., systemInfoModification, it may know that the system information will change at the next modification period boundary.

SIB1 may include a value tag, e.g., systeminfoValueTag, which may indicate whether a change has occurred in the SI messages. A WTRU may use the value tag (e.g., upon return from out of coverage) to determine or verify whether the previously stored SI messages may still be valid. A WTRU may consider stored system information to be invalid after a period of time such as three hours from the time or moment it was successfully confirmed as valid, for example, unless otherwise specified.

A WTRU, such as a WTRU performing cell selection, may read (e.g., receive and/or decode) the SI (e.g., MIB and/or one or more SIBs) that may be transmitted by a cell to obtain system information. The system information may include parameters that may be needed by or for the WTRU to determine if the cell is suitable and/or parameters that may enable the WTRU to access the cell (e.g., physical random access channel (PRACH) parameters for the initial random access procedure). After obtaining the SI, the WTRU may use the value tag to determine whether the SI has changed and/or whether to reacquire some or all of the SIBs.

In idle mode (e.g., RRC idle mode), a WTRU may be camped on a cell and/or attached to a network and may use a discontinuous reception (DRX) cycle to sleep and awaken, for example to receive and/or read pages from the network. A page may indicate an incoming call or may include one or more SI change indications. An SI change indication may include, for example, an indication of change of at least one SIB associated with the value tag or at least one SIB containing information that may be considered critical or time-sensitive, such as a SIB containing ETWS information. Upon or after reading a page that includes such an indication, the WTRU may acquire and/or read the related SIB or SIBs. The WTRU may wait until the start of the next modification period to acquire and/or read the related SIB or SIBs. In connected mode (e.g., RRC connected mode), a WTRU may receive pages from the network which may include one or more SI change indications.

A WTRU may receive a page via a downlink control information (DCI) scrambled with a paging radio network temporary identifier (P-RNTI). The DCI may include a grant for a physical downlink shared channel (PDSCH) carrying the paging message. Upon receipt of the page (e.g., the page DCI), the WTRU may read the corresponding PDSCH to obtain the paging message, which may include one or more SI change indications and/or other pages such as incoming call pages.

A WTRU in idle and/or connected mode may need to maintain up-to-date system information, for example up-to-date MIB and some SIBs such as SIB1 and SIB2-SIB8, depending on support of the radio access technologies (RATs) to which the SIBs may correspond.

The terminology mode and state may be used interchangeably herein. Idle mode may refer to RRC idle mode or state. Connected mode may refer to RRC connected mode or state. RRC_IDLE may be used to represent idle mode or state. RRC_CONNECTED may be used to represent connected mode or state.

SI messages may be repetitively transmitted, for example, to provide increased coverage. When a lot (e.g., 15 or 20 dB) of coverage improvement may be required, a large number of repetitions of the SI message transmission may be necessary. The overhead associated with a large number of SI message transmissions may be excessive and may potentially consume a large amount of PDSCH resources. Since WTRUs in CE mode may not need all the SIB information, a set (e.g., separate set) of one or more SIBs may be provided and/or used at least for WTRUs in CE mode. This or these SIBs may carry less information and/or may be transmitted less often than one or more SIBs (e.g., the full set or a subset of the SIBs), which may be used by or intended for WTRUs (or at least WTRUs) in non-CE mode.

SI messages containing one or more SIBs may be carried via the PDSCH, and the PDSCH may be scheduled in one or more subframes within the corresponding SI window. The PDSCH carrying SI messages may be dynamically scheduled with an associated PDCCH scrambled with the SI-RNTI. A WTRU may monitor, e.g., continually, the PDCCH scrambled with the SI-RNTI to receive an SI message in the corresponding SI window. If a WTRU receives multiple SI messages within an SI window, the WTRU may assume that the SI messages are being repetitively transmitted over multiple subframes. In a CE mode, the associated PDCCH may or may also need to be transmitted repetitively to obtain the enhanced coverage. Therefore, the dynamic scheduling of a PDSCH carrying an SI message in the same subframe may no longer be available in CE mode. A new mechanism for scheduling PDSCH carrying SI messages may be needed.

A WTRU may assume that the SI messages are the same within a modification period and may integrate SI messages within the modification period to improve the coverage of the SI message. The modification period configuration may be provided in SIB1. A coverage limited WTRU may need to integrate the SI message containing SIB1 multiple times within a modification period in CE mode. Since the modification period may be provided in SIB1, a WTRU may need to receive an SI message containing the SIB1 without knowing the modification period, which may result in performance degradation. With one or more SIBs for CE mode, the modification period for that or those SIBs may be fixed or provided by another means such as via the MIB.

The PDSCH containing an SI message may or may only be transmitted via a cell specific reference signal (CRS)-based transmission mode. An SI message may or may only be transmitted in a multimedia broadcast single frequency network (MBSFN) subframe in which a CRS is available in the PDSCH region. Since the MBSFN subframe configuration may be transmitted in one of the SI messages, a coverage-limited WTRU may not be able to obtain the MBSFN subframe configuration until it receives the SI message containing the MBSFN subframe configuration. The number of downlink subframes for SI message repetition may be limited to non-MBSFN candidate subframes, which may not be enough to achieve the required coverage enhancement.

CE mode or operation may provide increased coverage for WTRUs by repeating channels and/or information, e.g., that may be deemed necessary. In LTE, for example, system information may be broadcast according to a schedule, and a WTRU may monitor the PDCCH to determine the presence, location and parameters of a PDSCH carrying the SIBs. For a WTRU in CE mode, much of the system information may not be needed since WTRUs may have low mobility while in the CE mode. Further, the extensive repetition of system information broadcasting needed for CE mode may waste a substantial amount of WTRU battery power.

Embodiments described herein may enable a WTRU to receive a CE-SIB when in CE mode, without monitoring the PDCCH or enhanced PDCCH (EPDCCH), which may reduce the WTRU's battery consumption while the WTRU is in CE mode. Further, embodiments described herein may enable the WTRU to receive a subset of the available system information, which may enable the WTRU to receive or only receive the system information that it deems to be relevant, improving the efficiency of the system. The CE-SIB described herein may be interchangeably used with, but not limited to, MTC-SIB, LC-MTC-SIB, new SIB, compact SIB, and CE-MTC-SIB. There may be one or more CE-SIBs.

An MTC-SIB may be used by or for a CE mode WTRU, but its use may not be limited to a CE mode WTRU. For example, a reduced capability, such as a reduced bandwidth, WTRU may or may also use a MTC-SIB.

The terminology eNB and cell may be used interchangeably herein. The terminology normal, non-CE, and legacy may also be used interchangeably herein. In the described embodiments, the PDCCH or EPDCCH may be used as an example of a physical control channel. However, in each of the disclosed embodiments, the PDCCH, EPDCCH, any other physical control channel or combination of physical control channels may be used.

Figure 3:
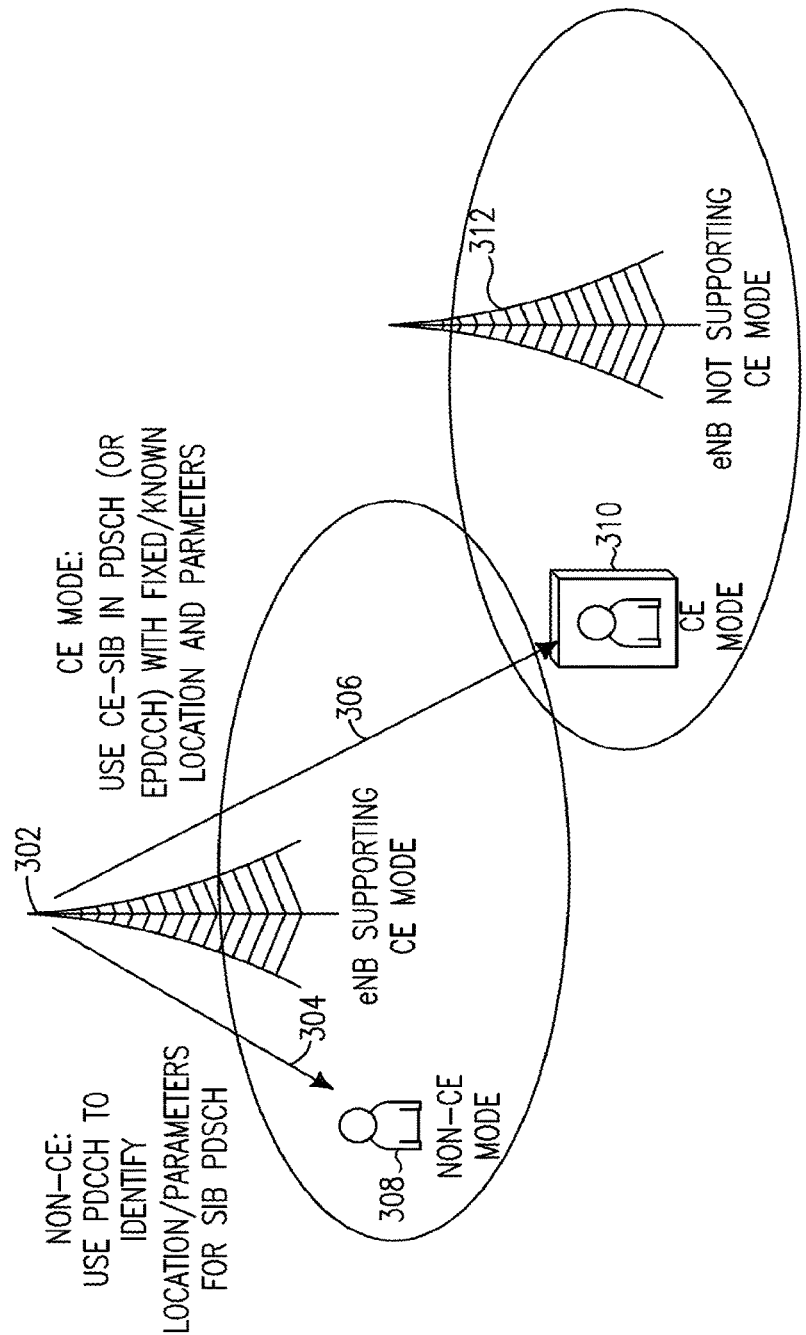
FIG. 3 is a diagram of an example of a system including WTRUs acquiring system information blocks (SIBs) in non-CE and coverage enhanced (CE) mode.

FIG. 3 is a diagram of an example system 300 including WTRUs acquiring SIBs in non-CE (e.g., legacy or normal) and CE modes. In the example illustrated in FIG. 3, a WTRU 308, which operates in non-CE mode, and a WTRU 310, which operates in CE mode, acquire system information from an eNB that supports CE mode 302. The non-CE mode WTRU 308 may use the PDCCH to identify the location and/or parameters for receiving one or more SIBs on the physical downlink shared channel (PDSCH) 304. The CE mode WTRU 310 may receive a CE-SIB on the PDSCH based on at least one of a known location or at least one known parameter 306. In an embodiment, the CE mode WTRU 310 may receive the CE-SIB on the PDSCH without use of the PDCCH. In another embodiment, the CE mode WTRU 310 may use a fixed and/or known EPDCCH as a container for the CE-SIB so that no PDSCH is required. The illustrated eNB 312 does not support CE mode. The eNB 302, which supports CE mode, and the CE mode WTRU 310 may use the EPDCCH without PDSCH for SI updates. In an embodiment, the CE-SIB may be a compact and separate SIB that may, for example, include only the SIBs that are relevant to the CE mode WTRU 310. There may be one or more CE-SIBs.

In FIG. 3, the WTRUs 308 and 310 are given different reference numerals. The WTRUs 308 and 310 may be separate WTRUs operating in different modes (e.g., WTRU 308 is in non-CE mode and WTRU 310 is in CE mode). However, the WTRUs 308 and 310 may be the same WTRU that is operable in multiple modes (e.g., in both non-CE and CE mode). For example, a WTRU may operate in non-CE mode some times and may operate in CE mode some other times.

Figure 4:
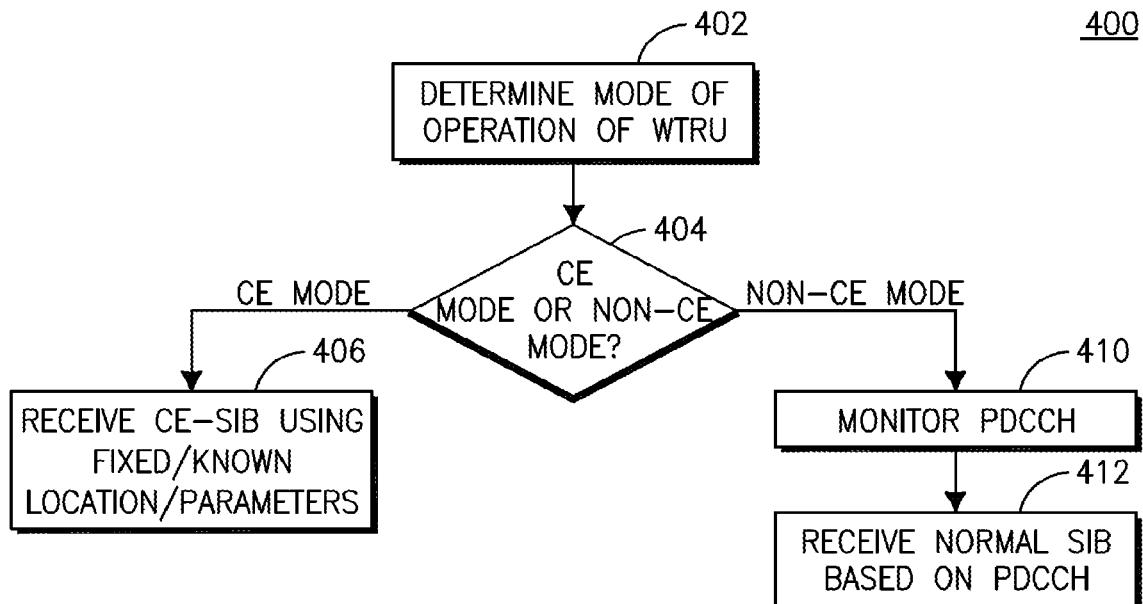
FIG. 4 is a flow diagram of an example method of SIB acquisition for a WTRU configured for use in a non-CE mode or a CE mode.

FIG. 4 is a flow diagram of an example method 400 of SIB acquisition for a WTRU configured for use in a non-CE mode or a coverage enhancement (CE) mode. In the example illustrated in FIG. 4, a WTRU determines what mode it is in (402). For example, the WTRU may determine whether it is in CE mode, normal mode, etc. On a condition that it is determined that the WTRU is in the CE mode (404), the WTRU may receive a CE-system information block (CE-SIB) on a physical downlink shared channel (PDSCH) (406). In an embodiment, a WTRU may also use information from the physical broadcast channel (PBCH) to determine whether to receive a CE-SIB on the PDSCH and/or to obtain one or more parameters for the reception of the CE-SIB. The WTRU may receive the CE-SIB, for example, based on at least one of a known location or at least one known parameter for the CE-SIB. In an embodiment, the WTRU may receive the CE-SIB on the PDSCH without receiving a control channel, such as the physical downlink control channel (PDCCH). On a condition that it is determined that the WTRU is in the non-CE mode (408), the WTRU may monitor the PDCCH (410) and receive a SIB (e.g., a legacy, non-CE or normal SIB) on the PDSCH based on information received on the physical downlink control channel (PDCCH) (412).

Figure 5:
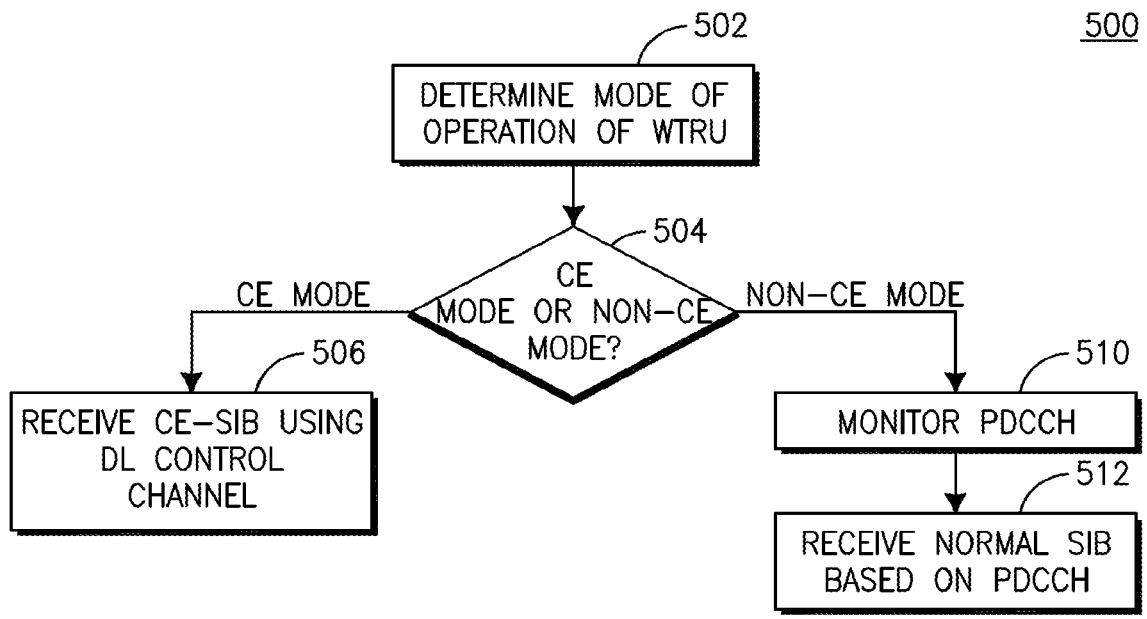
FIG. 5 is a flow diagram of another example method of SIB acquisition for a WTRU configured for use in a non-CE mode or a CE mode.

FIG. 5 is a flow diagram of another example method 500 of SIB acquisition for a WTRU configured for use in a non-CE mode or a CE mode. In the example illustrated in FIG. 5, a WTRU determines what mode it is in (502). For example, the WTRU may determine whether it is in CE mode, non-CE mode, etc. On a condition that it is determined that the WTRU is in the CE mode (504), the WTRU may receive a CE-system information block (CE-SIB) using a downlink control channel as a container (506). In an embodiment, the WTRU may receive the CE-SIB without receiving the PDSCH. On a condition that it is determined that the WTRU is in the non-CE mode (508), the WTRU may monitor the PDCCH (510) and receive a SIB (e.g., a legacy, non-CE, or normal SIB) on the PDSCH based on information received on the physical downlink control channel (PDCCH) (512).

CE WTRUs may include, for example, one or more of WTRUs that are in CE mode, coverage limited WTRUs, or WTRUs that need and/or use coverage enhancement techniques (e.g., repetition in the downlink (DL) and/or uplink (UL) of one or more channels (e.g., physical channels) such as control and/or data channels).

For a WTRU operating in CE mode, certain SIBs may be identified as essential or useful for the WTRU to operate in CE mode, and modifications may be desirable to allow the WTRU to receive them reliably. In an embodiment, CE-SIB messages may be used to enable CE mode WTRUs to receive (e.g., successfully or reliably receive) certain (e.g., the essential) SIBs or SI. In an embodiment, a CE WTRU is not prohibited from trying to receive non-CE (e.g., legacy or normal) SIBs, for example if it wishes to. For MIB, additional repetitions of the PBCH may be introduced within the 40 ms cycle to improve reliability of receipt for CE mode WTRUs. The terminology essential, important, necessary, desirable, useful, and selected may be used interchangeably herein.

A WTRU may operate in CE mode sometimes and may operate in non-CE mode at other times. A WTRU may change the mode in which it operates and may acquire and/or use SIBs according to its mode of operation. Upon or following change of mode to CE mode or non-CE mode, the WTRU may acquire or need to acquire the MIB and/or one or more SIBs according to its updated mode of operation.

In an embodiment, a CE-SI message may be used to improve reliability of transmission of certain SIBs, e.g., essential SIBs. The CE-SI message may include a subset of SIBs that are identified, e.g., as essential, for the CE mode of operation, and those SIBs may be merged together in one or more CE-SI messages that may be dedicated for CE WTRUs or used by or for at least CE WTRUs. By way of example, the subset of SIBs that may be included in the one or more CE-SI messages may include one or more of the SIBs from SIB1 to SIB16. A CE-SI message may be a compact CE-SI message that may include a subset of all non-CE mode or available SIBs. A CE-SI message may include SI, which may be part of one or more non-CE mode SIBs (e.g., inclusion of a SIB may not mean inclusion of the entire SIB). The terminology SIB, SI, and SI message may be used interchangeably herein. A CE-SI message may or may also include system information, which may be specific to CE mode, MTC operation, or a certain capability, such as operation with a reduced bandwidth.

A WTRU may determine whether to receive CE-SI messages or non-CE SI messages and may receive or attempt to receive the corresponding SI messages according to the determination. For example, if a WTRU received the CE PBCH to obtain the MIB, the WTRU may decide to receive a CE-SI message to obtain SIBs. For another example, if the WTRU determines DL signal quality (e.g., reference signal receive power (RSRP)) is below a predefined threshold, the WTRU may determine to receive a CE-SI message to obtain SIBs. In both examples, the WTRU may otherwise decide to receive SIBs via a non-CE SI message.

The CE PBCH may be a PBCH separate from the non-CE PBCH or a modified version of the non-CE PBCH with bits (e.g., spare bits) that may be used or included to support reduced capability and/or CE mode WTRUs. The bits may be MIB bits. The CE PBCH may be or may include the non-CE PBCH, a modified non-CE PBCH, or a new PBCH, where the CE PBCH may be transmitted with more repetitions than the non-CE PBCH (e.g., more than once every 10 ms). If a WTRU uses or needs to use one or more of the additional repetitions to successfully receive a new, non-CE, or modified non-CE PBCH (or MIB), the WTRU may determine to receive or attempt to receive CE-SI messages (or additional CE-SI messages). If a WTRU may not use or may not need to use an (e.g., any) additional repetitions to successfully receive a non-CE, or modified non-CE PBCH (or MIB), the WTRU may determine to receive or attempt to receive non-CE SI messages (or additional CE-SI messages). A PBCH may carry a MIB or MIB bits. The terminology PBCH and MIB may be used interchangeably herein.

In some embodiments described herein, SIBs and/or SI messages may exclude the MIB, which may be carried by the PBCH or CE-PBCH. In some other embodiments described herein, SIBs and/or SI messages may include the MIB, which may be carried by the PBCH or CE-PBCH.

CE-SI messages may be coded to allow multiple repetitions, for example, similar to existing procedures. The number of CE-SI message repetitions (e.g., allowed CE-SI message repetitions) may be increased with respect to the number of repetitions that may be used for non-CE SI messages, for example, to allow CE WTRUs additional time and/or information to be able to decode these messages.

A subset of SIBs or SI may be used for or deemed essential for CE and may be included in CE-SI messages. For example, in one embodiment, MIB, SIB1 and SIB2 may be considered to be the essential SIBs. A CE WTRU may or may be configured to read the MIB, e.g., at or at least at the regular pre-defined MIB location, and to read (e.g., only read) certain SIBs such as the essential SIBs (e.g., SIB1 and SIB2) using the CE-SI message. For another example, SIB1, SIB2 and SIB14 may be considered to be the essential SIBs. SIB1, SIB2 and SIB14 may be multiplexed in a CE-SI message. The CE WTRU may or may be configured to read MIB, SIB1, SIB2 and SIB14, e.g., as essential SIBs, before attempting to access the cell. CE-SI may include some or all of the contents of one or more SIBs, such as non-CE SIBs, such as SIB1, SIB2, and SIB14.

The contents of a CE-SI message may be the same as, or different from, the SIBs transmitted for non-CE WTRUs. Different versions of the same SIB may be multiplexed into the non-CE SI message and the CE-SI message. For example, certain information elements (IEs) that may not be deemed useful for a CE WTRU may be removed before multiplexing the SIB into the CE-SI message.

A WTRU operating in CE mode may receive or may be configured to receive one or more CE-SI messages and may obtain some or all SIBs or SI (e.g., for a cell) using (e.g., only using) CE-SI messages. The SIBs that are considered essential for the CE WTRU may be implicitly derived from the SIBs that are multiplexed in the CE SI messages being transmitted in the cell. The WTRU may consider all the SIBs scheduled within the CE SI messages to be minimum SIBs that should be acquired before it can access the cell.

Alternatively, the CE WTRU may receive or may be configured to receive (e.g., only receive) certain SIB information using CE-SI messages. The CE WTRU may receive or be configured to receive other SIBs using non-CE SI messages. For example, the cell may be configured to transmit certain SIBs that have lower periodicity requirements with an increased number of repetitions using non-CE SI messages, and a WTRU may receive or may be configured to receive them on non-CE SI messages.

The CE-SI messages may be transmitted with CE-SI windows. For example, a CE-SI message may be associated with a CE-SI window, where the CE-SI window may be defined as a certain amount of time. In an embodiment, the CE-SI windows may be multiplexed in the time domain. A CE WTRU may determine which CE-SI message is received in a certain subframe and/or frame based on the CE-SI window. In another embodiment, the CE-SI window may be multiplexed in the time and frequency domain. For example, the CE-SI window may be defined as time and frequency location. Multiple CE-SI windows may be overlapped in the time domain. A CE WTRU may differentiate the CE-SI message based on the frequency location of the CE-SI message. In another embodiment, the CE-SI messages may be scheduled by the associated PDCCH or EPDCCH, and the associated PDCCH or EPDCCH may indicate which CE-SI message is scheduled. For example, a CE-SI message may be associated with a certain SI-RNTI, such as CE-SI-RNTI-1, CE-SI-RNTI-2, and so on. In a further example, if three CE-SI messages are defined, such as CE-SI message 1, CE-SI message 2, and CE-SI message 3, then each CE-SI message may be associated with CE-SI-RNTI-1, CE-SI-RNTI-2, and CE-SI-RNTI-3.

A CE WTRU may determine whether to acquire or whether it needs to acquire certain SIBs based on WTRU conditions or capabilities. For example, a CE WTRU may acquire or may only acquire a SIB related to inter-RAT operation, e.g., SIB 7 and/or 8, if it is capable of supporting inter-RAT operations. For another example, a CE WTRU may only acquire multimedia broadcast multicast service (MBMS)-related SIBs, e.g., SIB 13 and/or 15, if it supports (MBMS) operations. SIBs 7 and 8 may be mapped to the same CE-SI-message. SIBs 13 and 15 may be mapped to the same CE-SI-message, which may be different from the CE-SI-message containing SIBs 7 and 8. In another example, a CE WTRU may acquire or may only acquire a SIB related to mobility or handover if it supports mobility or handover.

In an embodiment, the CE WTRU access stratum (AS) may be configured by higher layers, for example along with the public land mobile network (PLMN) information that may be provided before cell selection. Alternatively, this information may be preconfigured in the WTRU and may be provided to the AS when the WTRU is powered on. In another embodiment, the CE WTRU AS may be configured with the functionalities supported by the WTRU. The CE WTRU AS may have a preconfigured mapping to determine which SIBs the WTRU may or should acquire. For example, if support for home eNB (HeNB) is desired, the CE WTRU AS may include a HeNB related SIB, e.g., SIB9, in the list of SIBs that the WTRU may acquire or may need to acquire.

Once or after a CE WTRU determines which SIBs it may acquire or need to acquire, it may determine how these SIBs may be acquired. In an embodiment, the CE WTRU may, for example, first, check CE-SI scheduling information and/or some (e.g., all) of the CE messages to determine whether the CE SI or CE messages contain all the SIBs it needs. If certain SIBs are not available, the WTRU may try to acquire them using non-CE SI messages. Alternatively, the WTRU may acquire or only acquire SIBs that are available in the CE SI messages, and if some SIBs are unavailable, the WTRU may report to higher layers the functionalities that cannot be supported.

CE-SI message transmission and reception may be supported.

Before a WTRU begins receiving CE-SIBs, the WTRU may determine whether the cell supports CE-SI messages and/or CE mode. In an embodiment, the WTRU may detect support for CE-SI message transmission and/or CE mode in a cell during or based on PBCH reception or during a PBCH reception procedure. A coverage enhanced PBCH may be defined for the coverage enhanced mode of operation. The coverage enhanced PBCH (CE-PBCH) may be a repetitive transmission of at least the non-CE PBCH, which may be transmitted in a subframe (e.g., subframe 0) in each radio frame. The CE-PBCH may have or include repetition of the non-CE PBCH in one or more subframes such as at least in subframe 5 in one or more certain radio frames or in all radio frames.

In an embodiment, a WTRU may measure or may first measure downlink channel quality (e.g., RSRP), and if the downlink channel quality is lower than a predefined threshold, the WTRU may begin receiving the CE-PBCH. If the WTRU succeeds in decoding the MIB carried via the CE-PBCH, the WTRU may assume that CE-SI message transmission and/or CE mode is supported in the cell. The WTRU may attempt to correlate the PBCH transmitted in multiple subframes, e.g., the PBCH transmitted in subframe 0 and the PBCH repetition transmitted in one or more subframes such as subframe 5. If the correlation level is higher than a predefined threshold, the WTRU may assume that CE-SI message transmission is supported in the cell.

In another embodiment, a WTRU may attempt to check whether CE-PBCH is supported in the cell by correlating the PBCH transmitted in the non-CE PBCH time/frequency location (e.g. subframe 0) and the PBCH repetition transmitted in other time/frequency locations (e.g. subframe 5) in a certain radio frame used for CE-PBCH. If the correlation level is higher than a predefined threshold, the WTRU may assume that CE-PBCH and CE-SI message transmission are supported in the cell.

In another embodiment, a cell-ID list supporting CE-PBCH and CE-SI message transmission may be provided to a WTRU so that the WTRU may be informed of whether the cell supports CE mode after detecting the physical cell-ID after synchronization.

In another embodiment, the MIB, which may be carried via the PBCH or CE-PBCH, may implicitly or explicitly indicate whether CE mode (or CE-PBCH) is supported in the cell. A bit in the MIB or reserved in the MIB may be used to indicate support for CE mode, and/or a predefined CRC masking may be used to indicate support for CE mode. A WTRU may determine whether CE mode is supported in a cell based on the presence or value of the bit in the MIB or based on the CRC masking. If the WTRU, which may be in CE mode, determines the cell supports CE mode, the WTRU may receive or attempt to receive CE-SIBs or CE-SI messages.

In order for a WTRU to receive CE-SIBs or non-CE SIBs in a cell that supports both types of SIBs, a WTRU may need to be able to distinguish between the different types of SIBs being broadcast in the cell. In an embodiment, a WTRU may attempt to receive a certain type of SI message for SI reception based on a channel condition. For example, a WTRU may measure or determine downlink channel quality (e.g., RSRP or pathloss), and if the measured or determined downlink channel quality is lower than a threshold, the WTRU may or may decide to receive a CE-SI message type. The threshold may be predefined or determined as a function of at least one of downlink system bandwidth, number of CRS ports, and/or SFN number. The threshold may be different in connected mode and idle mode (e.g., a higher threshold may be used in RRC_CONNECTED and a lower threshold may be used in RRC_IDLE).

In another embodiment, a WTRU may attempt to receive a certain type of SI message based on a predefined rule. For example, a WTRU may attempt to decode a non-CE SI message, and if the WTRU does not succeed within a certain number of decoding attempts or a predefined time window, the WTRU may begin receiving CE-SI messages. For another example, if a WTRU is in RRC_IDLE, the WTRU may begin receiving a certain SI message-type based on the SI message-type received prior to entering RRC_IDLE mode. One or more of following rules may apply: if the cell-ID is the same as the cell-ID before the WTRU entered RRC_IDLE, the WTRU may begin with the SI message-type received before it entered RRC_IDLE; if the cell-ID is different from the cell-ID before the WTRU entered RRC_IDLE, the WTRU may begin receiving non-CE SI messages; if the cell-ID is different from the cell-ID before the WTRU entered RRC_IDLE, the WTRU may determine the SI message-type to receive based on downlink channel quality; if the cell-ID is different from the cell-ID before the WTRU entered RRC_IDLE, the WTRU may determine the SI message-type to receive based on the type of PBCH (e.g., CE-PBCH or non-CE PBCH) on which the WTRU received the MIB. For example, if a WTRU received the MIB via a non-CE PBCH, the WTRU may begin receiving non-CE SI messages; and a WTRU may begin receiving CE-SI messages if the WTRU received the MIB via the CE-PBCH. Cell-ID may be the physical cell-ID of the cell.

In another example, if a WTRU is in RRC_CONNECTED, the WTRU may determine the SI message-type based on the previous SI message-type the WTRU received.

In another embodiment, a WTRU may attempt to receive a certain type of SI message based on the channel reception quality of a physical channel. For example, if a WTRU received the MIB via a non-CE PBCH, the WTRU may begin receiving non-CE SI messages; and if a WTRU received the MIB via a CE-PBCH, the WTRU may begin to receive CE-SI messages. For another example, if a WTRU received the MIB via the CE-PBCH with a certain number of decoding attempts, and the number of decoding attempts is more than a predefined threshold, the WTRU may begin receiving CE-SI messages; otherwise, the WTRU may begin receiving non-CE SI messages. For another example, if a WTRU detected cell-ID from synchronization signals over a time window, and if the time window is longer than a predefined threshold, the WTRU may begin receiving CE-SI messages.

In another embodiment, if a WTRU is in RRC_CONNECTED, the WTRU may determine the SI message-type based on the CE-level (or number of repetitions) of the PDCCH, the enhanced-PDCCH (EPDCCH) and/or the PDSCH. If the CE level (or number of repetitions) of the PDCCH or EPDCCH is higher than a predefined number, the WTRU may use or determine to use CE-SI message-reception. Alternatively, if the total aggregation level (aggregation level x repetitions) of the latest PDCCH or EPDCCH received by the WTRU is larger than a predefined threshold, the WTRU may use or determine to use CE-SI message-reception. If the number of repetitions of the PDSCH is larger than a predefined number, the WTRU may use or determine to use CE-SI message-reception.

If the WTRU is in RRC_IDLE, the WTRU may determine the SI message-type based on the channel quality of the PBCH or the synchronization channel.

CE-SI messages may be transmitted and/or received via control channels. CE-SI messages may be transmitted and/or received in MBSFN subframes.

In an embodiment, CE-SI messages may be transmitted via a downlink control channel without PDSCH. A control channel (e.g., the PDCCH or the EPDCCH) may be used to carry one or more CE-SI messages, and the control channel may be transmitted with repetition, for example, for coverage enhancement.

A CE-SI message may be split into multiple sub-blocks, and each of the sub-blocks may not exceed a certain payload size, which may correspond to a DCI format (e.g., DCI format 1C or DCI format 1A). The payload size, which may correspond to a DCI format, may be defined as a function of system bandwidth (or a total number of PRBs in the downlink). Alternatively, the payload size may be a fixed number irrespective of the system bandwidth. The two or more sub-blocks may be transmitted over multiple subframes via the PDCCH or EPDCCH.

In an example, two or more sub-blocks for a CE-SI-message may be transmitted over multiple subframes via the PDCCH or EPDCCH, where the sub-blocks may be transmitted sequentially. For example, if three sub-blocks are configured for a CE-SI message, the first sub-block may be transmitted within the first time window and the second sub-block may be transmitted within the second time window, where the two time windows may be non-overlapped and the second time window may be located after the first time window. The windows may be non-overlapped and may be followed by the third sub-block. If a WTRU missed one of the sub-blocks, it may attempt to receive the missed sub-block within a modification period.

In another example where two or more sub-blocks are transmitted over multiple subframes via the PDCCH or EPDCCH, the sub-blocks may be transmitted in parallel. For example, if three sub-blocks are configured for a CE-SI message, each sub-block may be carried corresponding to the PDCCH or the EPDCCH, thus requiring three PDCCHs or EPDCCHs to carry three sub-blocks. Each PDCCH or EPDCCH carrying a sub-block may be scrambled with its own identifier (e.g., one or more of ID, scrambling ID, and RNTI). For example, three identifiers may be defined such as SI-RNTI-1, SI-RNTI-2, and SI-RNTI-3, and the cyclic redundancy check (CRC) of each PDCCH or EPDCCH carrying a sub-block may be scrambled with a corresponding RNTI.

The starting subframe of the PDCCH or EPDCCH carrying a sub-block may be a subset of subframes and/or radio frames. For example, the PDCCH or EPDCCH carrying the sub-block may be transmitted with repetition, and the starting subframe may be the subframe 1 in every odd radio frame. In another example, the starting subframe may be different according to the sub-block.

A CE-SI message may be split as evenly as possible into multiple sub-blocks, and the number of sub-blocks may be defined as a function of CE-SI message-size and payload size. For example, if the payload size is $N_P$ and a CE-SI message-size is $N_{SI}$ the number of sub-blocks may be $[N_{SI}/N_P]$.

In another embodiment, a CE-SI message may be transmitted via a control channel with a predefined aggregation level and a predefined repetition level. A WTRU may assume that the number of OFDM symbols used for the PDCCH in each subframe may be fixed to a predefined number when the WTRU receives CE-SI messages via the PDCCH. A WTRU may assume that the starting OFDM symbol for EPDCCH may be fixed to a predefined number when the WTRU receives CE-SI messages via the EPDCCH. The available resources for the EPDCCH may be calculated without CSI-RS configuration. A WTRU may assume that there is no CSI-RS configuration in the subframe when the WTRU receives CE-SI messages via the EPDCCH.

The PDCCH or EPDCCH carrying a full or partial CE-SI message may be transmitted in the PDCCH or EPDCCH common search space. A predefined aggregation level may be used, and the predefined aggregation level may not exceed a maximum aggregation level, e.g., 8 in the PDCCH and 16 in the EPDCCH. The number of repetitions may be predefined as a fixed number or as a function of at least one of CE-SI message size, system bandwidth, aggregation level and/or the number of the CRS port.

The PDCCH or EPDCCH carrying a full or partial CE-SI message may be transmitted in a subset of subframes. The subset of subframes may be continuous so that a WTRU may integrate the received signals within the subset of subframes. The subset of subframes may be referred to as a CE-SI message window. The subset of subframes may be distributed in the time domain. For example, one or more of the subframes {0, 4, 5, 9} may be used to transmit the PDCCH or EPDCCH carrying a full or partial CE-SI message.

In another embodiment, one or more CE-SI messages may be defined or configured according to the total system information size. For example, if the total system information size is bigger than a predefined threshold, the system information may be split into two or more CE-SI messages, and each CE-SI message may be carried via a control channel.

In the embodiment where one or more CE-SI message may be defined or configured according to the total system information size, a CE-SI message may be carried via the PDCCH or EPDCCH. Here, the total aggregation level (TAL; $N_{TAL}=N_{AL} \times N_R$) of the PDCCH or EPDCCH may be defined as a multiplication of the aggregation level ($N_{AL}$) and the number of repetitions ($N_R$). The TAL of the PDCCH or EPDCCH for a CE-SI message may be defined as a function of at least one of the CE-SI message size, system bandwidth, and/or MBSFN subframe configuration. Therefore, two or more CE-SI messages may be carried with a different $N_{TAL}$.

In an embodiment where one or more CE-SI message may be defined or configured according to the total system information size, if two or more CE-SI messages are transmitted, each CE-SI message may be transmitted with a different SI-RNTI. For example, if two CE-SI messages are configured or defined, two SI-RNTIs may be defined as SI-RNTI-1 and SI-RNTI-2. The two or more CE-SI messages may be transmitted in the same subframe. Accordingly, a WTRU may differentiate two or more CE-SI messages based on the SI-RNTI. The two or more CE-SI messages may be transmitted in a non-overlapped subframe.

In another embodiment, two or more CE-SI messages may be defined. A CE-SI message containing an MBSFN subframe configuration may be transmitted via a PDCCH or EPDCCH. Other CE-SI messages may be transmitted via a PDSCH in non-MBSFN subframes. A CE-SI message containing SIB2 (which may include an MBSFN subframe configuration) may be transmitted via a PDCCH or EPDCCH. A CE-SI message, such as one which may be transmitted via a PDCCH or EPDCCH, may be transmitted in both a non-MBSFN subframe and an MBSFN subframe.

A CE-SI message containing certain SIBs such as SIB1 and/or SIB2 may be transmitted, e.g., first, and may be carried via the PDCCH or EPDCCH. Other CE-SI messages which may contain other SIBs may be transmitted in the PDSCH region with associated PDCCH or EPDCCH or without associated PDCCH or EPDCCH. A CE-SI message may be defined, e.g., only, for mbsfn-SubframeConfigList, and the CE-SI message may be transmitted using the PDCCH or EPDCCH. The CE-SI message for mbsfn-SubframeConfigList may be transmitted first, and the other CE-SI messages may follow. The other CE-SI messages may be transmitted in the PDSCH region with the associated PDCCH or EPDCCH or without the associated PDCCH or EPDCCH.

The configuration of MBSFN subframes may be provided or included in a SI message or CE SI message. Until a WTRU receives the MBSFN subframe configuration, the WTRU may not know for certain which subframes may be non-MBSFN subframes except for the subframes that may not (or never) be used for or be allowed to be MBSFN subframes.

In an embodiment, a CE-SI message may be or may only be transmitted in non-MBSFN subframes. A WTRU in CE mode may assume that a CE-SI message may or may only be transmitted in non-MBSFN subframes or subframe candidates. For example, the subframes 0, 4, 5, and 9 in FDD may not be used for an MBSFN subframe configuration, and, therefore, the CE-SI message may be transmitted in one or more of subframes 0, 4, 5, and 9 in a radio frame used for CE-SI message-transmission. If there is one CE-SI message, the message may be transmitted in one or more of the subframes, which may be or may always be non-MBSFN subframes (e.g., since the MBSFN subframe configuration, which may identify the MBSFN subframes, may be included in the CE-SI message).

In another embodiment, two or more CE-SI messages may be defined or configured. At least one CE-SI message (e.g. the first CE-SI message), which may contain an MBSFN subframe configuration, may be transmitted in non-MBSFN subframes or subframes that may be known a priori to be non-MBSFN subframes, e.g., subframes 0, 4, 5, and 9 for FDD. The other CE-SI messages (e.g. subsequent CE-SI messages) may be transmitted in subframes that may not be configured as MBSFN subframes and/or may not be used for PMCH transmission. The CE-SI message containing the MBSFN subframe configuration (e.g., mbsfn-SubframeConfigList) may identify which subframes may be configured as MBSFN subframes and/or which may be used for PMCH transmission.

The CE-SI message containing the MBSFN subframe configuration may not be transmitted in potential MBSFN subframes (e.g. subframes other than 0, 4, 5, and 9 for FDD). CE-SI messages not containing the MBSFN subframe configuration may be transmitted in subframes that are not configured as MBSFN subframes. The available subframes for repetition of a CE-SI message may be determined as a function of the information (e.g., mbsfn-SubframeConfigList) contained in another CE-SI-message.

In an embodiment where two or more CE-SI messages are defined or configured, a CE-SI message containing the MBSFN subframe configuration, e.g., mbsfn-SubframeConfigList, may be transmitted or only transmitted in certain subframes, such as, the subframes 0, 4, 5, and 9. In an example, if a CE-SI message containing the MBSFN subframe configuration is transmitted with repetitions in a predefined or configured repetition window, the CE-SI message may be repetitively transmitted in the subframes within the repetition window except for the subframe containing non-CE SIB-1 (e.g., subframe 5 in an even-numbered radio frame), the subframes {1, 2, 3, 6, 7, 8}, and time domain duplex (TDD) uplink subframes. For another example, if a CE-SI message not containing the MBSFN subframe configuration is transmitted with repetitions in a predefined repetition window, the CE-SI message may be repetitively transmitted in the subframes within the repetition window except for the subframe SIB1, the MBSFN subframes, and TDD uplink subframes.

In an embodiment where two or more CE-SI messages are defined or configured, a CE-SI message containing the MBSFN subframe configuration may be transmitted with a predefined repetition number $N_R$. In this case, a CE-SI message may be repetitively transmitted in contiguous $N_R$ subframes except for the subframe containing non-CE SIB-1 (e.g. subframe 5 in an even-numbered radio frame), the subframes {1, 2, 3, 6, 7, 8}, and TDD uplink subframes. A CE-SI message not containing the MBSFN subframe configuration may be transmitted with a predefined repetition number $N_R$. A CE-SI message may be repetitively transmitted in contiguous $N_R$ subframes except for the subframes containing SIB-1, the MBSFN subframe, and TDD uplink subframes.

In another embodiment, a subset of potential MBSFN subframes may be used for CE-SI message transmission. For example, among the potential MBSFN subframes, such as, {1, 2, 3, 6, 7, 8}, a subset of subframes such as {1, 2} may be used for CE-SI message transmission. In this case, in the subset of potential MBSFN subframes, a WTRU may receive the PDSCH using a demodulation reference signal (DM-RS) (e.g., antenna port 7). The DM-RS may be scrambled with the cell-ID detected from the synchronization channel.

Two or more subsets of potential MBSFN subframes may be defined. A PDSCH containing a CE-SI message may be received using DM-RS in a first subset of potential MBSFN subframes, and a PDSCH containing a CE-SI message may be received using CRS in another subset of potential MBSFN subframes. PDSCH reception may be dependent on the subset of potential MBSFN subframes.

The subset of subframes for CE-SI message transmission may be predefined. A subset of the potential MBSFN subframes may be used for CE-SI message transmission in all radio frames. A subset of the potential MBSFN subframes may be used for CE-SI message transmission in a subset of radio frames. The radio frames using potential MBSFN subframes for the CE-SI message transmission may be predefined. Alternatively, the radio frames using potential MBSFN subframes for CE-SI message transmission may be implicitly configured as a function of the physical cell-ID.

The subset of potential MBSFN subframes for the CE-SI message transmission may be configured via a broadcasting channel. For example, two or more CE-SI messages may be defined or configured, and the first CE-SI message may include the information related to the subset of potential MBSFN subframes for CE-SI message transmission.

A CE WTRU may receive CE-SI message configuration related information from the PBCH (e.g. MIB).

In another embodiment, a WTRU in RRC_CONNECTED mode may receive a CE-SI message in potential MBSFN subframes that may not be configured as an MBSFN subframe, and a WTRU in RRC_IDLE may not receive a CE-SI message in all potential MBSFN subframes. A repetition window may be defined as a number of TTIs, consecutive subframes, or a radio frame. Within the repetition window, a CE-SI message may be transmitted repetitively in some or all subframes that may carry a CE-SI message. For example, the subframe carrying the CE-SI message may be defined as a non-MBSFN subframe. For another example, the subframe carrying the CE-SI message may be defined as non-MBSFN subframes not containing SIB1. For another example, the subframe carrying the CE-SI message may be defined as non-potential MBSFN subframes (e.g., subframes {0, 4, 5, 9}).

A CE-SI message may be transmitted repetitively in a certain frequency location in the subframes used for the CE-SI message transmission. For a WTRU in RRC_CONNECTED mode, the WTRU may receive CE-SI messages in the subframes {1, 2, 3, 6, 7, 8}, which may not be configured as MBSFN subframes if the WTRU needs to receive a CE-SI message. The MBSFN subframe configuration may be informed to the WTRU via a higher layer signaling. For a WTRU in RRC-IDLE, the WTRU may assume that all potential MBSFN subframes are configured as MBSFN subframes.

A Repetition period of CE-SI messages may be provided and/or used.

A CE-SI message may be coded to allow multiple repetitions. The number of allowed CE-SI message repetitions may be increased relative to non-CE SI procedures to allow CE WTRUs additional time and repetitions to decode CE-SI messages.

In an embodiment, the CE-SI messages may be repeated for a configured window or CE-repetition period, such that SIBs within the CE repetition period do not change. Thus, a CE WTRU may be allowed to combine one or more CE-SI messages received within a CE repetition period to decode the CE-SI messages within the repetition period, e.g., all the CE-SI messages. In an embodiment, the CE repetition window may be separately defined or may be defined as an SI window with a different window size for CE-SI messages (e.g., than for non-CE SI messages). In an embodiment, the CE repetition window may be larger for CE-SI messages than for non-CE SI messages. In an embodiment, the same CE-SI message may be repeated multiple times within the repetition window, and the CE-SI message may not change within a repetition window. A WTRU may use, combine or correlate multiple repetitions of a CE-SI message, for example, within a CE repetition window or within an SI window, to read, decode or successfully read or decode the CE-SI message.

The WTRU may be pre-configured with the SIBs that are available in the CE repetition period as well as the mapping and schedule of the CE-SI messages within the CE repetition window. Alternatively, the WTRU may obtain the scheduling and mapping information from a known location, and, upon acquiring the scheduling information, determine where and how it can acquire the CE-SI messages being transmitted by the cell.

The duration of the CE repetition period may be pre-configured in the WTRU or provided to the WTRU by higher layers (e.g., along with the PLMN configuration before cell selection is triggered). Alternatively, the WTRU may determine the duration of the CE repetition period by acquiring the scheduling information using pre-defined resources, for example, in the previous repetition period.

In an embodiment, a WTRU may be configured to look for an indication, which may be referred to as the ModificationIndication, to determine if the SI message in the next repetition window has a change. This may enable a WTRU to read the ModificationFlag and follow the concept of modification period without need to receive a paging message.

In an embodiment, a ModificationIndication flag may be sent at a pre-defined location or in a first CE-SI transmission occasion, and a WTRU may or may be configured to look for it at this fixed location. For example, the ModificationIndication flag may be located in the MIB (or CE-MIB). In another embodiment, the ModificationIndication may be part of the scheduling information sent in a repetition window for the subsequent repetition window. The ModificationIndication flag may be or may only be allowed to change every N frames or subframes and/or on certain SFNs where N may be a large number. The ModificationIndication flag may include one or multiple bits (e.g., 2 bits) to indicate a modification state or value, which the WTRU may compare with a previous state or value to determine whether or not there was or will be a change.

In another embodiment, certain repetition periods may be reserved for modifications, and the WTRU may be configured to determine which repetition period includes the modified information or the ModificationIndication based on configured parameters or a known repetition sequence. For example, a WTRU may be configured to know that every fifth repetition period may include a modified SI message, and the WTRU may look for the ModificationIndication at this window.

Multiple repetitions of CE-SI messages, which may enable operation with CE WTRUs, may increase overhead in the cell. Embodiments are described that may help reduce some of the overhead.

In an embodiment, the repetition windows for CE-SI message transmission may be limited in number, and the repetition windows may or may not be consecutive. The remaining time may be used for non-CE modification periods without CE-SI messages. For example, the CE-SI messages with repetitions for enhanced coverage may be less than 2 s out of every 10.24 s.

In an embodiment, a WTRU may be configured with a pattern that indicates the occurrence of CE repetition windows and non-CE modification periods. Non-CE SI transmissions using SI modification periods may occur in parallel with the CE-SI transmissions in CE repetition windows. A WTRU may listen to both or prioritize one over the other, for example, based on WTRU implementation.

A CE WTRU may determine or may be configured to determine when the CE repetition period occurs and may wake up or may only wake up at that time. For example, the WTRU may determine, know or be pre-configured to know that the repetition window will start when SFN mod X=0 and that the duration of the repetition period is Y time. For example, X may be 1024 and Y may be 2 s. Within a period of X frames (e.g., 10.24 s), the CE-SI repetition window may occur in the first Y time (e.g., 2 s) of the configured SFN cycle.

The WTRU may follow or may be configured with rules to allow reception of CE-SI messages and non-CE SI messages separately, in parallel, or simultaneously in the same frame. A CE WTRU may have limited buffer capacity and may not be able to acquire both CE-SI messages and non-CE SI messages in the same transmission time interval (TTI), for example if the WTRU is a low cost device. The CE mode device may or may be configured to wake up or only wake up on the repetition windows used by CE devices. The CE mode devices may or may be configured to prioritize CE-SI message-acquisition over non-CE SI message acquisition. A non-CE mode device may be configured to prioritize non-CE-SI message-acquisition.

CE-SI messages may be scheduled using one or more of dynamic, semi-static, or predefined scheduling.

Predefined or configured resources, which may include, for example, one or more of PDCCH, EPDCCH, and PDSCH resources, may be used in one modification period (or repetition period or window) to provide information regarding SI in a future SI modification period (or repetition period or window). The information regarding SI may include, for example, scheduling information for one or more SI messages (e.g., SIBs). The scheduling information may include, for example, information that may enable determination (e.g., by the WTRU) as to in which frame or frames and/or subframe or subframes and which time-frequency resources (e.g., RBs) the SI message or messages may be found. The scheduling information may pertain to a future SI modification period (or repetition period or window). For example, an eNB may transmit, and a WTRU may receive, scheduling information for CE-SI (e.g., a CE SIB) in one SI modification period, which may enable the WTRU to determine when (e.g., frames and/or subframes) and/or in what resources (e.g., RBs) to find the CE-SI in the next modification period. The terminology modification period, repetition period, repetition window, time period and time window, may be used interchangeably herein.

The scheduling information may include information such as that which may be included in compact scheduling information. Such information may include, for example, information regarding resource allocation or MCS level, which may enable the WTRU to find, acquire and/or read the PDSCH carrying the CE-SI and/or its contents. In an embodiment, the scheduling information may include information regarding the repetition of the CE-SI, for example, within a modification period or within another time window that may also be included in or with the scheduling information. Scheduling information may be included in a DCI format and/or a PDSCH, which may be associated with the DCI format. The DCI format may be scrambled with a new RNTI (e.g., CE-SI-RNTI), which may be used by CE WTRUs.

A WTRU, such as a CE WTRU, may receive and/or decode CE-SI scheduling information, which may be scrambled with a CE-SI-RNTI. The WTRU may use this scheduling information to locate and/or acquire the CE-SI. A WTRU may receive the CE-SI scheduling information from the predefined or configured location (e.g., channel, frames, subframes, and/or resources, such as RBs).

A WTRU may receive a CE-SI message without downlink control information. In an embodiment, one or more of time/frequency resources and MCS level for a PDSCH carrying a CE-SI message may be predefined.

The predefined time/frequency resources may be located in a PDSCH region over one or multiple subframes, which may exclude certain subframes such as one or more of the subframe containing SIB1, potential MBSFN subframes (e.g., subframes {1, 2, 3, 6, 7, 8} in FDD), and TDD uplink subframes. The time/frequency resources may be a set of PRBs in one or more subframes. The set of PRBs may be located in a fixed location that may be common for all system bandwidths. For example, the center six PRBs may be used for CE-SI messages.

In an embodiment, the set of PRBs may be located in or only in certain subframes, such as the subframes {4, 9} that do not contain PBCH repetitions. In an embodiment, the set of PRBs may be located in a subframe within a certain time frame. For example, a subset of radio frames may be used for the CE-SI message. A WTRU may or may first check or determine the SFN number of the radio frame, and, if the SFN number satisfies one or more predefined conditions, the WTRU may try to receive a CE-SI message in the radio frame. For another example, a subset of radio frames may be used for the CE-SI message, and the subset of radio frames may be defined as a function of physical cell-ID. The modulation order for the PDSCH containing the CE-SI message may be fixed as quadrature phase shift keying (QPSK).

The location of the set of PRBs containing a CE-SI message may be defined as a function of at least one of downlink system bandwidth, physical cell-ID, MBSFN subframe configuration, subframe number, radio frame number, and/or number of CRS ports. In an embodiment, the set of PRBs may be distributed over the system bandwidth. In an embodiment, the set of PRBs may be localized within the system bandwidth, and the location may be defined as a function of the physical cell ID. In an example, a modulo operation of physical cell ID with the total number of PRBs (e.g., number of PRBs for the CE-SI message) may determine or be used to determine the first PRB of the PRB set containing the CE-SI message. One or more RBGs may be used as the set of PRBs. In another example, the set of PRBs may be N PRBs, such as a consecutive N PRBs, and the starting PRB number (or another identifier of the location of the PRB set) may be determined as a function of at least one of physical cell ID, system bandwidth, subframe number, radio frame number, and/or a selection parameter. The selection parameter may be provided in the MIB. The selection parameter may identify or may be used to determine a PRB set among multiple PRB set candidates, which may be a function of one or more of the other parameters.

The number of PRBs for CE-SI message transmission (e.g. N) may be a fixed number, such as six (e.g. N=6). The number of PRBs for CE-SI message transmission may be indicated in the MIB, may be determined as a function of system bandwidth, and/or may be determined as a function of system parameters in the MIB. The modulation order for the PDSCH containing the CE-SI message may be fixed as QPSK.

In another embodiment, the time/frequency location of the PDCCH or EPDCCH carrying a CE-SI message may be predefined. For example, the first N CCEs in the common search space may be used for CE-SI message transmission, where N may be predefined or may be defined as a function of a subframe number and/or an SFN number. For another example, the location of N CCEs within the common search space may be changed according to the time. A subset of subframes may carry the PDCCH or EPDCCH containing the CE-SI message. For example, the potential subframes for paging may not be used for CE-SI message transmission. The location of N CCEs containing CE-SI messages may be changed over time as a function of the subframe number and/or SFN number.

In an embodiment, a CE-SI message may be transmitted in one or more resource candidates so that a WTRU may monitor or may need to monitor the resource candidates to receive the CE-SI message. The one or more resource candidates that may carry a CE-SI message may be one or more sets of PDSCH, PDCCH or EPDCCH. In each resource candidate, modulation order may be fixed (e.g. QPSK). In each resource candidate, a set of modulation orders may be used, and a WTRU may or may need to blindly detect the CE-SI message within the set. One or more resource candidates may be predefined. In an embodiment, the resource candidates may be defined in separate time/frequency resources. For example, non-overlapped PRB sets in a subframe may be used as the resource candidates. For another example, the same PRB sets in different subframes may be used as the resource candidates.

An eNB may transmit one or more SIBs that may be intended for at least certain WTRUs, such as CE WTRUs. These one or more SIBs (CE-SIBs) may combine system information that may be intended for these WTRUs with information that may be included in SIBs that may be intended for at least certain other WTRUs (e.g., non-CE WTRUs).

One or more CE-SI messages may be provided and/or used. At least one of the CE-SI messages may be carried by a PDSCH without an associated PDCCH or EPDCCH. For example, at least one of the CE-SI messages may be transmitted in a known or determined time/frequency location. The time/frequency location may be pre-defined, pre-configured, or determined as a function of system information or system signals acquired. For example, the time/frequency location of at least one of the CE-SI messages may be known or determined from one or more of configuration in the MIB, physical cell-ID, SFN, subframe number, or another CE-SI message. The terminology known and determined may be used interchangeably herein.

In an embodiment, a certain CE-SI message (e.g. a first CE-SI message) may be transmitted in a known or determined time and frequency location (e.g., in a PDSCH in a known or determined time and frequency location). The certain CE-SI message may indicate EPDCCH common search space in which scheduling information for one or more subsequent CE-SI messages may be transmitted. For example, the certain CE-SI message may contain the location of EPDCCH common search space, which may associate with CE mode, and a CE WTRU may monitor EPDCCH common search space to acquire the scheduling information of another CE-SI message. The EPDCCH common search space associated with CE mode may be transmitted in certain subframes and/or radio frames.

In another embodiment, a certain CE-SI message (e.g. a first CE-SI message) may be transmitted via a PDSCH in a known or determined time and frequency location and the certain CE-SI message may include the time and frequency location of other CE-SI messages. The certain CE-SI message may be the CE-SI message including SIB-1, or the certain CE-SI message may be the first CE-SI message if two or more CE-SI messages are used. In an example, the time and frequency location for the certain CE-SI message may be predefined such as a center 6 PRBs in subframe 5 in an odd-numbered SFN. In another example, the time and frequency location for the certain CE-SI message may be determined as a function of the system parameters acquired from a previous system information (e.g. MIB or CE-MIB).

In another embodiment, a first CE-SI message may be transmitted in a known or determined time and frequency location. The time and frequency location of another, e.g., subsequent, CE-SI message may be indicated by a previous CE-SI message. For example, if three CE-SI messages are used, the first CE-SI message location may be a known or determined location and the second CE-SI message location may be indicated from the first CE-SI message. The third CE-SI message location may be indicated from the first or second CE-SI message.

In another embodiment, the scheduling information of the PDSCH carrying a certain CE-SI message (e.g. a first CE-SI message) may be indicated from the MIB (or CE-MIB). For example, the MIB (or CE-MIB) may carry the scheduling information of the certain CE-SI message, which may include one or more of frequency location, time location, modulation order, transport block size (TB) size, and number of PRBs.

In another embodiment, the PDSCH carrying a certain CE-SI message (e.g. a first CE-SI message) may be transmitted in a known time and frequency location, and other scheduling information may be indicated from the MIB (or CE-MIB). In an example, the modulation order of the PDSCH and the TBS size may be indicated from the MIB (or CE-MIB). In another example, the modulation order of the PDSCH may be fixed (e.g. QPSK), and a set of TBS sizes may be defined for the certain CE-SI message. A subset of TBS sizes may be indicated from the MIB. A CE WTRU may perform blind decoding attempts within the subset of TBS sizes.

In another embodiment, the PDSCH carrying a certain CE-SI message (e.g. a first CE-SI message) may be transmitted in a known time location (e.g. subframe and/or radio frame), and the other scheduling information may be indicated from the MIB (or CE-MIB). In an example, a set of frequency locations of the PDSCH and the TBS size may be indicated from the MIB (or CE-MIB), where the set of frequency locations and TBS size may be a subset of all possible candidates. In another example, a set of frequency locations of the PDSCH may be determined as a function of one or more system parameters including physical cell-ID and system BW, and the frequency location within the set may be explicitly indicated from the MIB (or CE-MIB), where the set of frequency locations may be a subset of all possible candidates. A set of TBS sizes may be determined as a function of one or more of system parameters, and the TBS size within the set may be explicitly indicated from the MIB (or CE-MIB), where the set of TBS size may be a subset of all possible candidates.

One or more CE-SI messages may be carried by a PDSCH, and the frequency location of the PDSCH may be determined as a function of the system parameters, CE-SI message number, and/or subframe and radio frame number. In an example, the frequency location of a first CE-SI message and a second CE-SI message may be different in a certain subframe and/or radio frame. In another example, the frequency location of a certain CE-SI message may be different according to the subframe number and/or radio frame number (e.g. SFN). The frequency location of a certain CE-SI message may be determined as a function of subframe number, radio frame number, and/or an associated SI-RNTI.

A means for SI update detection without paging may be provided and/or used.

A WTRU may determine whether certain SIBs (e.g., SIBs associated with a value tag) have been updated based on whether the value tag is different from the value tag the WTRU has stored, for example, from a previous reading of the value tag. The value tag may be obtained from reading a certain SIB, such as SIB1.

An eNB that supports CE WTRUs may transmit a SIB, such as a CE-SIB, which may contain the value tag at certain predefined times (e.g., SIB1 may be transmitted in subframe 5 every 20 ms) and in the same time/frequency resources (e.g., the same RBs) in each transmission, such as within a certain time window or modification period. The SIB may be transmitted in a PDSCH.

A CE WTRU may assume that a SIB that contains the value tag may be transmitted at certain pre-defined times (e.g., SIB1 may be transmitted in subframe 5 every 20 ms) and in the same time/frequency resources (e.g., the same RBs) in each transmission within a certain time window (e.g., within a modification period).

In each of a subset of the of the predefined times, the WTRU may acquire the DCI format, which may be scrambled with a certain RNTI, such as an SI-RNTI, to obtain the DCI format that may provide the scheduling information (e.g., resource allocation, MCS level, etc.) for the PDSCH that may carry the desired SIB. The WTRU may combine multiple acquisitions of the DCI format to successfully decode it.

Based on the scheduling information decoded from the DCI format or other means, such as based on predefined or preconfigured scheduling information, a WTRU may acquire the PDSCH that may carry the SIB that may include the value tag. In each of a subset of the predefined times, which may be after the subset the WTRU used to acquire the DCI format, the WTRU may receive the PDSCH that may carry the SIB. The WTRU may combine multiple acquisitions of the PDSCH to successfully read the contents of the SIB.

A mechanism for SI update detection with paging may be provided and/or used.

Paging may be used to indicate the update of one or more SIBs, which may indicate the need for a WTRU to acquire or reacquire one or more SIBs. Certain WTRUs (e.g., CE WTRUs and/or reduced bandwidth (BW) WTRUs) may have difficulty reading the paging DCI format and the paging message on the PDSCH in the same subframe. For these and/or other WTRUs, the paging mechanism or part of the paging mechanism (e.g., the paging mechanism related to SIB updates) may be modified, for example, to eliminate the need to acquire and/or read a paging message PDSCH in the same subframe as a paging in a DCI format. Acquiring and reacquiring a SIB may include reading the contents of the SIB.

In an embodiment, a DCI format may be used to page and/or otherwise indicate one or more SIB updates intended for one or more WTRUs, where the DCI format may be transmitted without an associated PDSCH. The DCI format may not contain DL-grant-related-information, and the DCI format may be smaller than the typical DCI format that may be used for paging and that may be associated with a PDSCH. The DCI format may be intended for use by, or may be used by, WTRUs in connected mode and/or idle mode.

The DCI format may be scrambled with an RNTI where the RNTI may be different from the P-RNTI that may be used for paging non-CE WTRUs (e.g., Pshort-RNTI). Another RNTI or mechanism for scrambling the DCI format may be used and still be consistent with the embodiments described herein.

The content of the DCI format may include an indication of a system information modification, such as systemInfo-Modification, which may indicate whether one or more SIBs that may be associated with this indication (e.g., one or more SIBs that may be associated with a value tag) have changed or will change at or before the start of a future modification period. This indication may have, for example, values of at least TRUE and/or FALSE. In another example, the indication may be a value similar to a value tag, which may indicate a value or state such that a changed value or state indicates one or more of the associated SIBs have changed or will change at the start if the next modification period.

When a WTRU receives and/or decodes a DCI format, for example one scrambled with Pshort-RNTI, that contains an SI modification indication with a value indicating that the modification has or will occur (e.g., the value TRUE or the value has changed), the WTRU may acquire or reacquire one or more SIBs that may be associated with the indication or value tag (e.g., at or after the start of the next modification period). The WTRU may acquire and/or read the SIB that contains the relevant SIB scheduling information (e.g., SIB1 or a CE SIB that contains SIB scheduling information) first, for example, to ensure that it has up to date scheduling information, before attempting to acquire other SIBs.

The content of the DCI format may include an ETWS indication (e.g., etws-Indication) that may indicate whether one or more SIBs that may be associated with the ETWS (e.g., SIB10 and/or SIB11) may have changed. This indication may have at least the values of TRUE or FALSE. In another example, the indication may be a value similar to a value tag, which may indicate a value or state such that a changed value or state indicates one or more of the associated SIBs may have changed. When a WTRU (e.g., an ETWS-capable-WTRU) receives and/or decodes a DCI format, for example one scrambled with Pshort-RNTI, containing an ETWS indication with a value indicating that the modification has or will occur (e.g., the value TRUE or the value has changed), the WTRU may acquire or reacquire one or more SIBs associated with ETWS. The WTRU may begin attempting to acquire or reacquire these one or more SIBs without waiting for the next modification period (e.g., as soon as possible). The WTRU may acquire and/or read the SIB containing the relevant SIB scheduling information (e.g., SIB1) first, for example to ensure it has up to date scheduling information, before attempting to acquire the one or more ETWS-related-SIBs.

The content of the DCI format may include a CMAS indication (e.g., cmas-Indication-r9), which may indicate whether one or more SIBs that may be associated with the CMAS (e.g., SIB12) may have changed. This indication may have at least the values of TRUE and/or FALSE. In another example, the indication may be a value similar to a value tag, which may indicate a value or state such that a changed value or state indicates one or more of the associated SIBs may have changed. When a WTRU (e.g., a CMAS-capable-WTRU) receives and/or decodes a DCI format, such as one scrambled with Pshort-RNTI, containing a CMAS indication with a value indicating the modification has or will occur (e.g., the value TRUE or the value changed), the WTRU may acquire or reacquire one or more SIBs associated with the CMAS. The WTRU may begin attempting to acquire or reacquire these one or more SIBs without waiting for the next modification period (e.g., as soon as possible). The WTRU may acquire and/or read the SIB that contains the relevant SIB scheduling information (e.g., SIB1) first (e.g., to ensure it has up to date scheduling information) before attempting to acquire the one or more CMAS-related-SIBs.

The content of the DCI format may include an EAB parameter modification indication (e.g., eab-ParamModification-Indication-r11), which may indicate whether one or more SIBs that contain EAB parameters (e.g., SIB14) may have changed. This indication may have at least the values of TRUE and/or FALSE. In another example, the indication may be a value similar to a value tag, which may indicate a value or state such that a changed value or state indicates one or more of the associated SIBs may have changed. When a WTRU (e.g., an EAB-capable-WTRU) receives and/or decodes a DCI format, for example one scrambled with Pshort-RNTI, containing an EAB parameter modification indication with a value indicating that the modification has or will occur (e.g., the value TRUE or the value changed), the WTRU may acquire or reacquire one or more SIBs associated with EAB. The WTRU may begin attempting to acquire or reacquire these one or more SIBs without waiting for the next modification period (e.g., as soon as possible). The WTRU may acquire and/or read the relevant SIB containing the SIB scheduling information (e.g., SIB1) first (e.g., to ensure it has up to date scheduling information) before attempting to acquire the one or more EAB-related-SIBs.

Reception and/or decoding of a DCI format may include combining (e.g., soft combining) repetitions of the DCI format. For example, certain WTRUs, such as coverage-enhanced-WTRUs, may receive repetitions of a DCI format and may combine them together in order to successfully decode the DCI format and/or obtain its contents.

The transmission of the DCI format may be according to the same (or similar) schedule and/or rules as non-CE paging or may be according to a different schedule and/or rules. The schedule and/or rules may be different depending on the type of SIB change that may be indicated. For example, the schedule and/or rules for indicating a SIB update for at least one of ETWS, CMAS, and EAB may be the same as (or similar to) the schedule and/or rules for non-CE paging. The schedule and/or rules for indicating value-tag-related-SIB-updates may be different from the schedule and/or rules for non-CE paging. Following the same (or similar) schedule and/or rules may mean using discontinuous reception (DRX) cycles and/or paging occasions for at least the first transmission of the DCI format, for example when the DCI format may be repeated for coverage enhancement. The DCI format may be transmitted by the eNB and/or received by the WTRU in the PDCCH or EPDCCH.

When SIBs are updated or are to be updated, the eNB may page the WTRUs to inform them of the change or impending change. The page may be indicated by a paging DCI format (e.g., scrambled with the P-RNTI), which may indicate to the WTRU to read a paging message in a PDSCH, which may indicate to the WTRU to read the SIBs that may have changed. Certain WTRUs, such as CE WTRUs, may require a significant amount of repetition in order to read DCI formats and the PDSCHs for both the paging message and the SIBs. Since repeating the SIBs may waste system bandwidth, and use of significant repetition may result in delay in receiving the updates, it may not be desirable to use or rely on more repetition for the SIBs (or certain SIBs) for these WTRUs.

In an embodiment, a DCI format may be used or transmitted (e.g., by an eNB) to page and/or otherwise indicate one or more SIB updates to or intended for one or more WTRUs, where a PDSCH may be associated with the DCI format and at least some of the modified SIB information may be included in the PDSCH. The DCI format may be scrambled with an RNTI, and the RNTI may be different from the P-RNTI that may be used for paging non-CE WTRUs (e.g., Psib-RNTI). Any other RNTI or means for scrambling the DCI format may be used and still be consistent with the embodiments described herein.

When a WTRU, such as a CE WTRU, receives and/or decodes a DCI format (e.g., one scrambled with Psib-RNTI) that contains an indication indicating that at least some SIB information has changed, the WTRU may acquire the associated PDSCH (which may include combining repetitions of the PDSCH), for example, to obtain the updated SIB information. The DCI format may include one or more indications as to what type of SIB information has or will change, as described for the SIB update DCI format without an associated PDSCH.

One or more indications as to what type of SIB information has or will change may be included in the associated PDSCH. The type of SIB information that may be indicated may include one or more of CE-SIB information, value-tag-related-SIB-information, ETWS-related-SIB-information, CMAS-related-SIB-information, and EAB-related-SIB-information. A separate indication may be provided for one or more types (e.g., each type) of SIB information that may indicate whether there are or will be changes to that type of information.

An indication in the DCI format may indicate whether the updated SIB information is included in the PDSCH associated with the DCI format. If the indication indicates that the updated SIB information is included in the associated PDSCH, the WTRU may acquire the associated PDSCH (which may include combining repetitions of the PDSCH) to obtain the updated SIB information. If the indication indicates that the updated SIB information may not be included in the associated PDSCH, the WTRU may acquire the updated SIB information by acquiring the SIBs themselves. The default (e.g., lack of indication) may indicate to the WTRU to acquire the SIBs from the associated PDSCH or from the SIBs themselves.

Whether to acquire the updated SIB information from the associated PDSCH may be specific to the type of SIB information. For example, inclusion of an indication in the DCI format that indicates whether to acquire the updated SIB information from the associated PDSCH may be specific to the type of SIB information. Certain updated SIB information, for example updated critical information such as updated ETWS and/or CMAS information, may be (or may always be) included in the PDSCH associated with the DCI format. An indication as to whether to acquire the updated SIB information from the PDSCH associated with the DCI format or from the SIBs themselves may not be included for SIB information or types of SIB information that may always be included in the PDSCH associated with the DCI format and/or which may not (or may never) be included in the PDSCH associated with the DCI format.

Certain SIB information (e.g., certain SIB1 or CE-SIB information) may be included in the PDSCH associated with the DCI format. For example, one or more value tags (e.g., the value tag used to indicate update of non-CE SIBs) may be included. A value tag may be included in the PDSCH associated with the DCI format in at least one of the following scenarios: when the value tag has changed, always, or in certain other scenarios. In another example, the SIB scheduling information may be included. SIB scheduling information may be included in the PDSCH associated with the DCI format in at least one of the following scenarios: when the SIB scheduling information has changed, always, or in certain other scenarios.

For an updated SIB included in the PDSCH associated with the DCI format, the information included for the SIB may include one or more of the SIB information that has changed, all of the SIB information whether or not it has changed, or certain SIB information, such as important SIB information, regardless of whether or not it has changed.

For SIBs associated with a value tag, all of the SIBs may be included in the PDSCH associated with the DCI format regardless of whether or not their contents changed. For SIBs associated with a value tag, a further indication or indications may be included (e.g., in the DCI format or the PDSCH) to indicate which SIBs have changed. The SIBs that have changed may be included in the PDSCH.

When a SIB is included in the PDSCH, some or all of the contents of the SIB may be included. The contents that may be included may be at least one of the updated contents, important contents (e.g., scheduling information), or all the contents. For SIBs, such as SIBs that may be associated with a value tag, the updated SIB contents may be applied by the WTRU according to a modification period. For example, if the updated SIB content is received by a WTRU in one modification period, the WTRU may apply the updated content at the start of the next modification period.

If repetition of the DCI format and/or the PDSCH associated with the DCI format is used by the WTRU to successfully receive updated SIB content, the WTRU may use the starting point and/or the ending point (e.g., as determined by the WTRU) of the repetition of the DCI format and/or the PDSCH to determine when to apply the updated SIB content. For example, if the starting point and ending points are in the same modification period, the WTRU may apply the updated SIB content at the start of the next modification period. For another example, if the starting point and ending points are in different modification periods, the WTRU may apply the updated SIB content after receiving it and may not wait for the next modification period.

A cell may transmit a PBCH or MIB or make another transmission that may be repeated. A WTRU may receive the PBCH, the MIB, or the other transmission.

One or more of the PBCH, the MIB, the transmission of the PBCH, the transmission of the MIB, or the other transmission, may use, consist of, be comprised of or include a number of bits such as N bits. Some of the N bits, for example, M bits, may be used by or may be intended for use by at least certain WTRUs such as non-CE WTRUs (e.g., WTRUs of a certain release and/or earlier such as LTE release 12 and/or earlier). Some of the N bits, for example, P bits, may be or may only be used by or may be or may only be intended for use by certain WTRUs such as, for example, WTRUs that may or may not have a certain capability or functionality, for example, WTRUs that may operate in a reduced bandwidth with respect to a bandwidth of a cell, WTRUs that may support or operate in CE mode or use CE mechanisms, such as repetition, and WTRUs that may support or use EPDCCH common search space, among others. Certain bits of the N bits may be reserved for future use and/or may be considered spare bits. For example, there may be S spare bits. S=N-M may represent the number of spare bits. S may, for example, equal 10. P may be or may need to be a subset of S. Since the spare bits may be limited, it may be desirable to use as few as possible of those bits to support a new or certain function or capability. M and P may be integers greater than or equal to zero.

In an embodiment, some bits, such as the M bits of the PBCH, may have the same meaning at all times, for example to support non-CE WTRUs, while one or more other bits, such as one or more of the P bits of the PBCH, may have a different meaning at different times, for example to limit the use of spare bits. The meaning may be a function of at least time, such as the time of the transmission. For example, a cell may transmit some bits of the PBCH with the same meaning at all times and one or more other bits of the PBCH with a different meaning at different times where the difference in meaning may be at least a function of the time of the transmission such as the SFN, subframe and/or timeslot of the transmission. A WTRU may receive some bits of the PBCH from a cell and interpret the meaning of the bits the same way at all times. The WTRU may receive one or more other bits of the PBCH from the cell and may interpret the meaning of the bits differently, where the difference in interpretation may be a function of at least the time of the transmission or reception, such as the SFN, subframe, and/or timeslot of the transmission or reception.

In an embodiment, the contents of the PBCH (e.g., the parameters included in the MIB) may be different at different times. At least some of the contents of the PBCH may be a function of at least time, such as the time of the transmission or reception. A WTRU may receive the PBCH from a cell and may interpret the content as a function of at least the time of the transmission or reception, such as the SFN, subframe, and/or timeslot of the transmission or reception. A cell may transmit some content of the PBCH as a function of at least the time of the transmission or reception, such as the SFN, subframe, and/or timeslot of the transmission or reception. For example, which parameters are included in the transmission may be a function of the time of the transmission or reception.

The meaning of the bits or at least some of the contents of the PBCH in each transmission time (e.g., subframe, frame, SFN, or timeslot) may be predefined or preconfigured or otherwise known or determined by the WTRU and/or the cell. Alternatively, the meaning or contents may be configured dynamically by one or more bits (or flags or parameters), which may be included in the PBCH, for example by the cell. The WTRU may use one set of bits (or flags or parameters) in the PBCH to interpret the meaning or contents of another set of bits or content in the PBCH. The WTRU may use a part of the contents of the PBCH to interpret the meaning or contents of another part of the PBCH. The cell may transmit or provide or use a part of the contents of the PBCH to identify the meaning or contents of another part of the PBCH. Whether or not the bits change their meaning (or at least some of the contents of the PBCH change) may be a function of one or more of the capabilities, functionality, or feature support of the cell or other entity that may transmit the bits. Which bits and/or how many bits change their meaning (or what contents are included or change) may be a function of one or more of the capabilities, functionality, or feature support of the cell or other entity that may transmit the bits. For example, a cell that may support certain capabilities, functionality, or features, such as reduced bandwidth WTRUs, coverage limited WTRUs, or EPDCCH common search space, may transmit different PBCH contents or one or more bits in a PBCH with a different meaning at different times, where the difference in meaning may be a function of the time of the transmission. Examples of the time of transmission include SFN, subframe, and timeslot of transmission.

Bits changing their meaning may be or include contents changing. Contents changing may be or include bits changing their meaning. Contents may include one or more parameters. The terminology contents, parameters, and bits may be used interchangeably herein.

A WTRU may receive one or more bits in the PBCH from the cell and may interpret or may understand to interpret the meaning of the bits (or at least some of the content of the PBCH) differently at least as a function of time based on the WTRU's and/or the cell's support of certain capabilities, functionality, or features, such as reduced bandwidth, coverage enhancement, or EPDCCH common search space. The WTRU may determine the cell's support for certain capabilities, functionality, or features from one or more bits (or content) in the PBCH, which may not change its (or their) meaning as a function of time and/or other transmissions received from the cell.

The PBCH (or other transmission) may have or use a transmission period, TP1, for some (e.g., M) bits, which may be 40 ms. During TP1, the PBCH may be transmitted, for example, by a cell, one or more times, such as at least once every 10 ms, where the values of the M bits may not change. The M bits may change their value at the start of a TP1 or every TP1. The meaning of the M bits, for example, for or in the cell, may not or may never change. For example, for TP1=40 ms, the start of TP1 may correspond to SFN mod 4=0, and the M bits may change their value (or may be allowed to change their value) each time SFN mod 4=0, but may not change their meaning. The PBCH bits, which may change their meaning as a function of time, may change their meaning on TP1 boundaries. For example, a number, for example P1, bits may have 2 meanings, which depend on time. The meaning of the bits may alternate every k×TP1 and may stay constant until the next k×TP1, where k is an integer that may be greater than 0. For TP1=40 ms and k=1, the meaning and interpretation of the meaning of the bits may alternate every 40 ms. The meaning and interpretation of the meaning may depend on SFN. For example, for SFN mod 8=0 through SFN mod 8=3, the P1 bits may have one meaning, and for SFN mod 8=4 through SFN mod 8=7, the P1 bits may have another meaning. This may be represented by the function F=Floor [0.25×SFN mod 8], where the P1 bits may have one meaning when F=0 and another meaning when F=1.

Another representation may be F=Floor [(SFN mod (2×k× 4))/(k×4)], where the P1 bits may have one meaning when F=0 and another meaning when F=1. For k=2, the P1 bits may alternate meaning every 80 ms.

There may be multiple subsets of bits, such as subsets of the P bits, which may change their meanings at different times. There may or may also be a subset of the P bits, such as P0 bits, which may not change its meaning over time. For example, for one subset of a number of bits, such as P1 bits, the meaning may change or alternate every k1×TP1. For another subset of bits, such as P2 bits, which may be non-overlapping with the P1 bits, the meaning may change or alternate every k2×TP1. In an example, k1=1 and k2=2. The P1 bits may change or alternate their meaning every 40 ms while the P2 bits may change or alternate their meaning every 80 ms. The P0 bits may have the same meaning at all times.

In another example, a number, for example P1, bits may have m meanings, which may depend on time. The bits may cycle through their meanings every k×TP1 and repeat a meaning every m×k×TP1. For k=1, m=4, and TP1=40 ms, the P1 bits may cycle through each of their 4 meanings every 40 ms (e.g., and stay the same for 40 ms) and have the same meaning every 160 ms.

Figure 6:
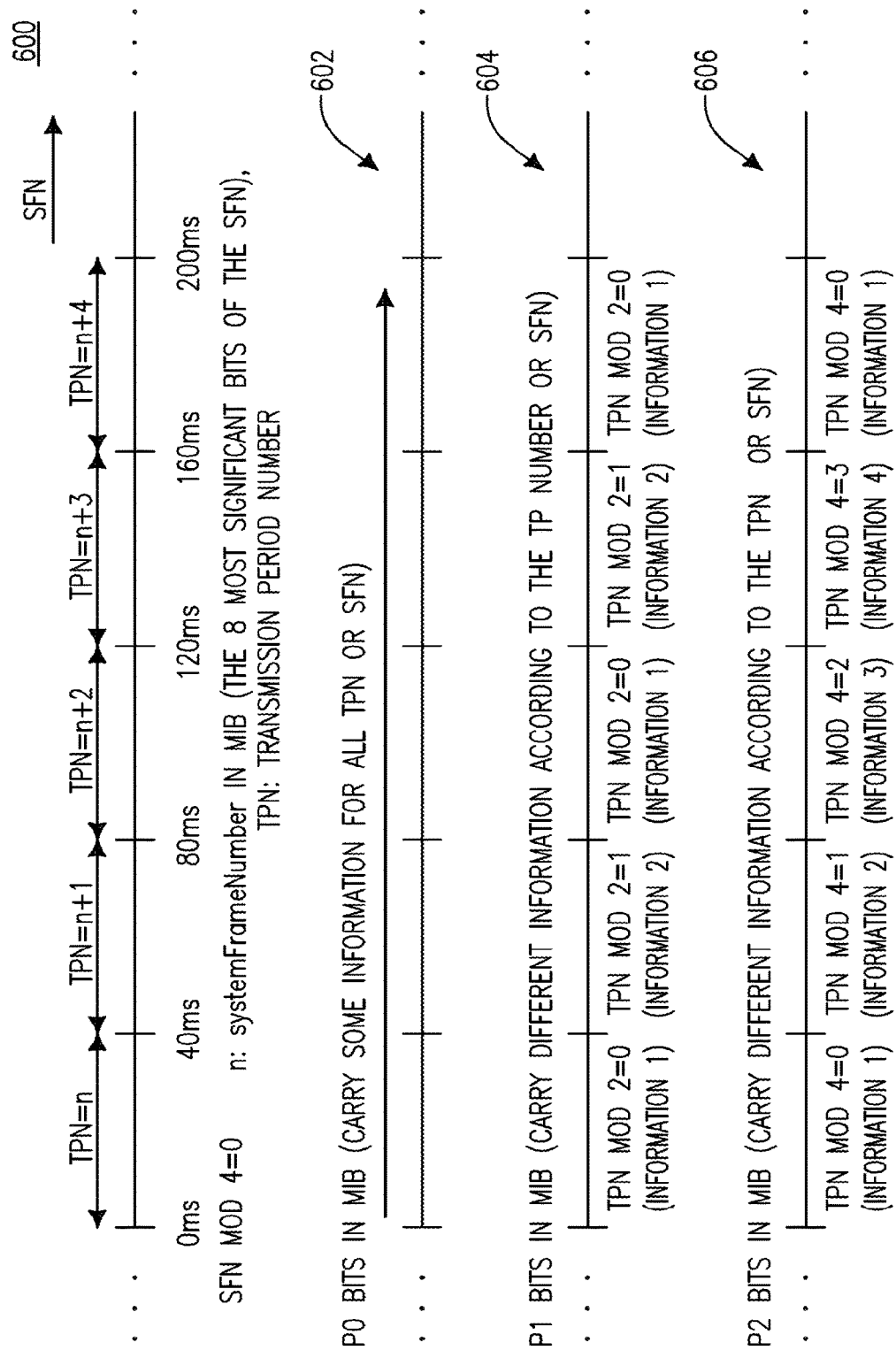
FIG. 6 is a diagram of example transmissions that include a number of bits that may change meaning according to a time or time period.

FIG. 6 is a diagram 600 of example transmissions that include a number of bits that may change meaning according to a time or time period. In the example illustrated in FIG. 6, the transmissions may be, for example, MIB or PBCH transmissions, which may be repeated. In the illustrated example, a transmission period (TP) is identified by a transmission period number (TPN), e.g., n, n+1, . . . . In the example, a TP is 40 ms. A TPN may represent or correspond to the SFN or the SFN contained or transmitted in the MIB, which may be the most significant 8 bits of a 10-bit SFN. In the example transmissions over multiple TPs, a number of bits do not change meaning 602 (e.g., the bits carry the same information for all TPN or SFN). In the example transmissions, a number of bits alternate meanings every TPN or SFN 604 (e.g., bits alternate between carrying Information 1 or Information 2 at each TPN or SFN). In the example transmissions, a number of bits cycle through 4 different meanings every TPN or SFN 606 (e.g., bits cycle through carrying Information 1, Information 2, Information 3 or Information 4 at each TPN or SFN). For the duration of a TP with a certain TPN, the MIB may be repeated. For the repetitions during a certain TP, the meaning of the transmitted bits may be the same. In the example, a MIB, PBCH, or other transmission in a certain TP (e.g., with a certain TPN or SFN) may include bits that do not change meaning according to a time or time period 602 and one or more sets of bits that change according to a time or time period 604 and/or 606. In the example, content or parameters may be substituted for bits, and the content or parameters may stay the same or change according the TPN or SFN.

In another embodiment, at least some of the contents of (e.g., parameters included in) the PBCH may change as a function of time. The contents of the PBCH, which may change as a function of time, may change on TP1 boundaries. For example, there may be a number of sets of contents where the set transmitted may depend on time. For example, there may be 2 sets of contents and the set transmitted may alternate every k×TP1 and may stay constant until the next k×TP1, where k is an integer which may be greater than 0.

In another embodiment, one or more bits may have meaning in some transmission periods (e.g., PBCH transmission periods), but not in others. For some transmission periods, the bits may be unused, set to zero or reserved for future use. For example, a set of bits may be transmitted in every other transmission period, such as in even transmission periods, and may alternate meanings in every other transmission. For a transmission period of 40 ms, the bits may be transmitted and may alternate their meaning in even multiples of 40 ms. In the odd multiples of 40 ms, the bits may be unused, zero, or reserved for future use. The use and meaning of the bits may not change for transmissions within a transmission period.

The terminology PBCH and MIB may be used interchangeably herein and are used for exemplary purposes. Another transmission of another type may be substituted for PBCH or MIB and still be consistent with the embodiments described herein. The terminology cell and eNB may also be used interchangeably herein.

In an example, the bits that may be transmitted by a cell in the PBCH may indicate values of certain parameters, which may identify a functionality or capability of the cell and/or may be used or needed by a WTRU to receive another transmission from the cell, such as a CE-SIB (e.g., CE-SIB1), MTC-SIB (e.g., MTC-SIB1), or EPDCCH common search space (CSS). One or more PBCH bits may have different meaning at different times, where the different meanings may be different parameters of the cell or of the other transmission. A cell may transmit one or more PBCH bits with different meanings at different times to convey parameters for the cell and/or another transmission. A WTRU may receive the PBCH bits with different meanings at different times to obtain the parameters for the cell and/or other transmission. The WTRU may use one or more of these parameters to at least one of monitor, receive, successfully receive, and/or decode the other transmission. The WTRU may use one or more of these parameters to determine a functionality or capability of the cell.

The parameters for the other transmission may include at least one of the following for the transmission: time location, frequency location, transport block size (TBS), modulation order, number of repetitions, system information (SI) window or other window during which individual transmissions or repetitions may be integrated, SI modification period, and/or starting symbol in the transmission subframes. For EPDCCH, such as EPDCCH CSS, the parameters may or may also include at least one of the following: the number of EPDCCH candidates (e.g., the number of blind decodes), the ECCE aggregation levels, the number of ECCE repetitions, selection of distributed or localized mode of operation, and the DCI format size.

Time location may identify the subframe or set of subframes in each frame or each identified frame in which the transmission may be transmitted or received. Time location may identify the frames in which the transmission may be transmitted or received. Bits, for example, a few bits, may be used to identify one of a set of predefined subframes and/or frames. For example, if the time location has the possibilities of every 40 ms, 80 ms, 160 ms, or 320 ms, 2 bits may be used to identify one of four possibilities. SFN=0 may be considered the start for timing. In another example, if the subframe within a frame has the possibilities of 0 or 5, one bit may be sufficient. If the subframe within a frame has the possibilities of 0, 4, 5, or 9, two bits may be sufficient. WTRU reception of the PBCH may be performed prior to determining a TDD UL/DL configuration of the cell. If the time location indicates a subframe for a DL transmission that may not be DL in all TDD UL/DL configurations, the WTRU may understand that the indicated subframe is a DL subframe in the cell.

The frequency location may identify the set of PRBs that may be used for the transmission. The number of PRBs may be identified. For a number of PRBs less than or equal to 6, 3 bits may be used. For a selection from a limited number of options (e.g., 2, 4, or 6 PRBs), fewer bits may be used. The starting PRB may or may also be identified.

The starting PRB or the location of the PRBs within the bandwidth of the cell may be one of a set of starting PRBs or bandwidth locations. The set may be fixed or determined based on one or more of cell ID, SFN, and other factors. The frequency location, which may be provided, for example in the PBCH, may identify which starting PRB or bandwidth location within the set the transmission may use.

In an example, 1 bit, for example b1, may be used to indicate a cell's support for reduced bandwidth WTRUs, 1 bit, for example b2, may be used to indicate the cell's support for coverage enhanced WTRUs, 2 bits, for example bb1, may be used to indicate the periodicity of CE-SIB1, 2 bits, for example bb2, may be used to identify the frequency band for CE-SIB1, 2 bits, for example bb3, may be used to identify the number of PRBs for CE-SIB1, and 2 bits, for example bb4, may be used to identify the TBS for CE-SIB1. Including all the bits together may need 10 bits. Alternatively, one bit with alternating meaning may be used to represent b1 and b2 in different time periods, for example alternating 40 ms time periods. Two bits with cycling meaning may be used to represent bb1, bb2, bb3, and bb4 in different time periods, such as each of the four 40 ms time periods in a 160 ms cycle.

A WTRU may determine the value of the SFN from bits in the PBCH, which may not change their meaning. One or more bits may be included in the PBCH to increase the window of time during which frames may be counted and during which signals may be repeated and/or modified. SFN combined with the added bit or bits may be referred to as a long SFN or LSFN. LSFN may replace SFN in the embodiments herein and still be consistent with this invention. A WTRU may use the value of SFN or LSFN to determine the meaning of the PBCH bits in a subframe.

In another example, the bits that may be transmitted by a cell in the PBCH may indicate part (e.g., a segment) of a parameter or set of parameters, which may identify one or more functionalities or capabilities of the cell and/or may be used or needed by a WTRU to receive another transmission from the cell, such as a CE-SIB (e.g., CE-SIB1), MTC-SIB (e.g., MTC-SIB1), or EPDCCH common search space (CSS). One or more PBCH bits may have different meaning at different times, where the different meanings may be different parts (e.g., segments) of a parameter or set of parameters of the cell or of the other transmission. A cell may transmit one or more PBCH bits with different meanings at different times to convey different parts of a parameter or set of parameters of the cell or of the other transmission. A WTRU may receive the PBCH bits with different meanings at different times to obtain the different parts of a parameter or set of parameters of the cell for the cell and/or other transmission. The WTRU may combine (e.g., reassemble or concatenate) the parts of the parameter or set of parameters to determine the value of the parameter or set of parameters. The WTRU may use one or more of these parameters to at least one of monitor, receive, successfully receive, and/or decode the other transmission. The WTRU may use one or more of these parameters to determine a functionality or capability of the cell. The terminology part and segment may be used interchangeably herein.

Physical layer segmentation and/or reassembly (e.g., of the segments) may be used by the cell and/or WTRU. T bits may represent a parameter or set or parameters of a cell or transmission. The T bits may be segmented into at least 2 sets of bits. Some or all of the segments may have an equal number of bits. A segment may have fewer bits if, for example, T is not divisible by the number of segments. If T is not divisible by the number of segments, padding may be used (e.g., zeros) in one or more (e.g., the last) segment, which may enable all segments to have the same number of bits. For N segments, each segment may include SB=T/N bits. For example, if T=20 and N=4, then SB=5. The 20 bits may be transmitted as 5 bits in each of 4 PBCH transmissions, for example in each of 4 consecutive PBCH transmission periods. For SB bits per segment, N may equal CEIL[T/SB]. If N is not a power of 2, one or more PBCH transmissions may not include segment bits or may include padding (e.g., zeroes) instead of segment bits. If T is not a multiple of SB, at least one segment may include one or more padding bits. For example if T=20 and SB=3, then N=7. The 20 bits may be transmitted as 3 bits in each of 8 PBCH transmissions, where 6 of the transmission may include 3 parameter bits, 1 transmission may include 2 parameter bits and 1 transmission may include no parameter bits. Padding or zeroes may be used when no parameter bits are transmitted.

A WTRU may, for example based on SFN, understand which segment bits it may receive. A WTRU may wait until it receives enough (e.g., all) of the segment bits to determine a value of a parameter or values of a set of parameters.

The set of N segments with a periodicity of PD may be repeated every PD. Each of the N segments may be repeated every PD. From PD to PD, a segment may have the same value or a different value (e.g., if the value was modified by the cell). The periodicity of changes (or possible changes) may be longer than the segment periodicity, for example the periodicity of changes (or possible changes) may be a multiple of the segment periodicity.

How bits may be segmented and when the segments may be transmitted (e.g., subframe, frame, SFN) may be predefined, preconfigured, and/or known or determined by the WTRU and/or the cell.

What is claimed:

1. A method, implemented in a wireless transmit/receive unit (WTRU), the method comprising:
receiving downlink control information (DCI) and a cyclic redundancy check (CRC) scrambled using a paging radio network temporary identifier (P-RNTI), wherein the DCI does not include downlink (DL) grant information for an associated paging message, and wherein the DCI includes at least one of a single bit indication of system information modification, an earthquake tsunami warning system (ETWS), or a commercial mobile alert service (CMAS); and on a condition that the at least one of the single bit indication of the system information modification, the ETWS, or the CMAS indicates that a system information block (SIB) has changed or will change, acquiring or re-acquiring the SIB.

2. The method of claim 1, wherein the single bit indication of the system information modification has a value indicating TRUE to indicate that one or more SIBs associated with the system information modification has changed or will change.

3. The method of claim 1, wherein the single bit indication of the ETWS or the CMAS has a value indicating TRUE to indicate that one or more SIBs that are associated with the ETWS or CMAS have changed or will change.

4. The method of claim 1, further comprising:
on a condition that the single bit indication of the ETWS or the CMAS indicates that a SIB has changed or will change, acquiring or re-acquiring SIB-1 before acquiring or re-acquiring the SIB.

5. The method of claim 1, further comprising receiving, on a physical broadcast channel (PBCH), one or more parameters for receiving and monitoring a physical downlink control channel (PDCCH) in a common search space for the SIB.

6. The method of claim 5, wherein the one or more parameters comprises at least one of a time location and a frequency location of the common search space.

7. The method of claim 6, wherein the time location comprises at least one of an identity of one or more frames or a starting symbol.

8. The method of claim 6, wherein the frequency location comprises at least one of a set of resource blocks (RBs), a number of RBs or a starting RB.

9. A wireless transmit/receive unit (WTRU) comprising:
a transceiver; and
a processor,
wherein the transceiver and the processor are configured to receive downlink control information (DCI) and a cyclic redundancy check (CRC) scrambled using a paging radio network temporary identifier (P-RNTI), wherein the DCI does not include downlink (DL) grant information for an associated paging message, and wherein the DCI includes at least one of a single bit indication of system information modification, an earthquake tsunami warning system (ETWS), or a commercial mobile alert service (CMAS), and wherein the transceiver and the processor are further configured to acquire or re-acquire a system information block (SIB) on a condition that the at least one of the single bit indication of the system information modification, the ETWS, or the CMAS indicates that the SIB has changed or will change.

10. The WTRU of claim 9, wherein the single bit indication of system information modification has a value indicating TRUE to indicate that one or more SIBs associated with the system information modification have changed or will change.

11. The WTRU of claim 9, wherein the single bit indication of the ETWS or the CMAS has a value indicating TRUE to indicate that one or more SIBs that are associated with the ETWS or CMAS have changed or will change.

12. The WTRU of claim 9, wherein the processor and the transceiver are further configured to acquire or re-acquire SIB-1 before acquiring or re-acquiring a SIB on a condition that the single bit indication of the ETWS or the CMAS indicates that the SIB has changed or will change.

13. The WTRU of claim 9, wherein the processor and the transceiver are further configured to receive, on a physical broadcast channel (PBCH), one or more parameters for receiving and monitoring a physical downlink control channel (PDCCH) in a common search space for the SIB.

14. The WTRU of claim 13, wherein the one or more parameters comprises at least one of a time location and a frequency location of the common search space.

15. The WTRU of claim 14, wherein the time location comprises at least one of an identity of one or more frames or a starting symbol.

16. The WTRU of claim 14, wherein the frequency location comprises at least one of a set of resource blocks (RBs), a number of RBs or a starting RB.

* * * * *